United States Patent
Stamos

(10) Patent No.: US 9,106,661 B1
(45) Date of Patent: Aug. 11, 2015

(54) COMPUTING RESOURCE POLICY REGIME SPECIFICATION AND VERIFICATION

(71) Applicant: Artemis Internet Inc., San Francisco, CA (US)

(72) Inventor: Alexander Charles Stamos, San Carlos, CA (US)

(73) Assignee: Artemis Internet Inc., San Francisco, CA (US)

( * ) Notice: Subject to any disclaimer, the term of this patent is extended or adjusted under 35 U.S.C. 154(b) by 0 days.

(21) Appl. No.: 14/274,668

(22) Filed: May 9, 2014

Related U.S. Application Data

(63) Continuation-in-part of application No. 13/444,484, filed on Apr. 11, 2012, now Pat. No. 8,799,482.

(60) Provisional application No. 61/823,823, filed on May 15, 2013.

(51) Int. Cl.
| | |
|---|---|
| *H04L 29/06* | (2006.01) |
| *G06Q 30/02* | (2012.01) |
| *H04L 12/24* | (2006.01) |
| *G06F 9/54* | (2006.01) |
| *H04L 12/26* | (2006.01) |

(52) U.S. Cl.
CPC ...... *H04L 63/10* (2013.01); *G06F 9/54* (2013.01); *G06Q 30/0283* (2013.01); *H04L 41/0893* (2013.01); *H04L 12/2602* (2013.01)

(58) Field of Classification Search
CPC .... H04L 41/0893; H04L 12/2602; G06F 9/54
USPC ........................................................ 726/13
See application file for complete search history.

(56) References Cited

U.S. PATENT DOCUMENTS

| | | | |
|---|---|---|---|
| 7,451,488 B2 | 11/2008 | Cooper et al. | |
| 7,467,203 B2 | 12/2008 | Kang et al. | |
| 7,499,865 B2 | 3/2009 | Aggarwal et al. | |
| 7,792,994 B1 | 9/2010 | Hernacki | |
| 7,849,502 B1 | 12/2010 | Bloch et al. | |
| 7,849,507 B1 | 12/2010 | Bloch et al. | |
| 7,984,163 B2 | 7/2011 | Almog | |
| 8,261,351 B1 | 9/2012 | Thornewell et al. | |
| 8,347,100 B1 | 1/2013 | Thornewell et al. | |
| 8,484,694 B2 | 7/2013 | Diebler et al. | |
| 2001/0052007 A1 | 12/2001 | Shigezumi | |
| 2004/0006706 A1 | 1/2004 | Erlingsson | |
| 2004/0030784 A1 | 2/2004 | Abdulhayoglu | |
| 2004/0098485 A1 | 5/2004 | Larson et al. | |
| 2004/0158720 A1 | 8/2004 | O'Brien | |
| 2004/0193703 A1 | 9/2004 | Loewy et al. | |
| 2005/0015626 A1 | 1/2005 | Chasin | |
| 2005/0273841 A1 | 12/2005 | Freund | |
| 2006/0021031 A1 | 1/2006 | Leahy et al. | |
| 2006/0021050 A1 | 1/2006 | Cook et al. | |
| 2006/0041938 A1 | 2/2006 | Ali | |
| 2006/0047798 A1 | 3/2006 | Feinleib et al. | |

(Continued)

*Primary Examiner* — Justin T Darrow
*Assistant Examiner* — Dao Ho
(74) *Attorney, Agent, or Firm* — Van Pelt, Yi & James LLP

(57) ABSTRACT

A computing resource policy regime specification is received from a first user. The computing policy regime specification comprises a plurality of rules. The received computing resource policy regime specification is associated with a computing resource. An assessment of compliance by the computing resource with the computing resource policy regime specification is dispatched.

20 Claims, 24 Drawing Sheets

(56) References Cited

U.S. PATENT DOCUMENTS

| | | |
|---|---|---|
| 2006/0167871 A1 | 7/2006 | Sorenson et al. |
| 2006/0230380 A1 | 10/2006 | Holmes et al. |
| 2007/0204040 A1 | 8/2007 | Cox |
| 2007/0214283 A1 | 9/2007 | Metke et al. |
| 2007/0214503 A1 | 9/2007 | Shulman et al. |
| 2008/0059628 A1 | 3/2008 | Parkinson |
| 2008/0140441 A1 | 6/2008 | Warner |
| 2008/0147837 A1 | 6/2008 | Klein et al. |
| 2008/0222694 A1 | 9/2008 | Nakae |
| 2009/0037976 A1 | 2/2009 | Teo et al. |
| 2009/0055929 A1 | 2/2009 | Lee et al. |
| 2009/0164582 A1 | 6/2009 | Dasgupta et al. |
| 2010/0049985 A1 | 2/2010 | Levow et al. |
| 2010/0094981 A1 | 4/2010 | Cordray et al. |
| 2010/0100957 A1 | 4/2010 | Graham et al. |
| 2010/0125895 A1 | 5/2010 | Shull et al. |
| 2010/0131646 A1 | 5/2010 | Drako |
| 2010/0191847 A1 | 7/2010 | Raleigh |
| 2011/0010426 A1 | 1/2011 | Lalonde et al. |
| 2011/0167474 A1 | 7/2011 | Sinha et al. |
| 2011/0182291 A1 | 7/2011 | Li et al. |
| 2011/0247073 A1 | 10/2011 | Surasathian |
| 2011/0258237 A1 | 10/2011 | Thomas |
| 2011/0276804 A1 | 11/2011 | Anzai et al. |
| 2011/0314152 A1 | 12/2011 | Loder |
| 2012/0131164 A1 | 5/2012 | Bryan et al. |
| 2012/0203904 A1 | 8/2012 | Niemela et al. |
| 2012/0303808 A1 | 11/2012 | Xie |
| 2013/0007540 A1 | 1/2013 | Angelsmark et al. |
| 2013/0276053 A1 | 1/2013 | Thornewell et al. |
| 2013/0097699 A1 | 4/2013 | Balupari et al. |
| 2013/0239209 A1 | 9/2013 | Young et al. |

Regime Configuration | Sign Out

| Web 31/33 | Network 20/20 | Email 9/9 | Malware 7/7 |

Reflected XSS — WEB
Open Redirect — WEB
Session Fixation — WEB
HSTS — WEB
CSRF — WEB
CSP — WEB ─ 602

Content Security Policy [ OFF ]

VERIFIED BY:
☐ COMPUTER
☑ HUMAN

PRIORITY: [ Important ◄► ]

TEST SCHEDULE: [ Weekly ◄► ] ─ 604

OPTIONS
Must have reporting URL
No bare wildcard
No wildcard followed by a public suffix Domain
No unsafe "eval"
No unsafe inline
No schemes other than HTTPS
Must specify default src
Must specify self or none for default source You have made the following changes to the Content Security Policy rule:
1) Test schedule: monthly→weekly = $250 per month additional scanning fee
2) Options: ─ 606
 Must have reporting URL (off)
 No bare wildcard (off)
 No unsafe "eval" (on)
 No unsafe inline (on)
= $100 per month savings on scanning fees ─ 608
Total: $150 in additional monthly scanning fees will apply ─ 610

Accept and Confirm ─ 612

FIG. 6

| Time Due | Domain | Violation Category | Violation Details | | | Sign Out |
|---|---|---|---|---|---|---|
| 1 day<br>2 violations | v2.acme.bank<br>SQLi<br>14:22:19 remaining Ⓦ | 902 ⟶ payments.acme.bank<br>Reflected XSS<br>27:39:19 remaining Ⓦ | | | | |
| 2 days<br>5 violations | blog.acme.bank<br>Service Patc...<br>32:44:19 remaining Ⓜ | blog.acme.bank<br>Unknown Mal...<br>37:11:19 remaining Ⓜ | blog.acme.bank<br>Stored XSS<br>37:48:19 remaining Ⓜ | blog.acme.bank<br>SQLi<br>38:22:19 remaining Ⓦ | img.acme.bank<br>Known Malw...<br>38:22:19 remaining Ⓜ | |
| 7 days<br>5 violations | payments.acme.bank<br>CSRF<br>5 days remaining Ⓦ | www.acme.bank<br>HTTPS<br>6 days remaining Ⓦ | mail.acme.bank<br>SMTP TLS<br>6 days remaining Ⓔ | blog.acme.bank<br>CSP<br>7 days remaining Ⓦ | img.acme.bank<br>Authenticode...<br>7 days remaining Ⓜ | |
| 30 days | payments.acme.bank<br>Blacklisted S... | dev.acme.bank<br>Blacklisted S... | | | | |

FIG. 9

| Dashboard | Tickets | Accounts Manager | Rule Mappings | Scan Scheduler | Joe Blow: Tier 1 Security Engineer ▶ |
|---|---|---|---|---|---|
| OPEN | CLOSED | | | | |
| Priority ▶ | Ticket ID ▽ | Type ▽ | Timestamp ▽ | Account ▽ | Asset ▽ |
| High | 080487 | Scan: Network | 01/01/2014 12:12 GMT | Acme Inc. | 191.111.001 |
| High | 092941 — 1602 | Result: Web | 01/02/2014 08:00 GMT | General Industries | foobar.com |
| High | 123456 | Result: Web | 01/02/2014 08:01 GMT | General Industries | foobar.com |
| High | 148345 | Result: Web | 01/02/2014 08:02 GMT | General Industries | foobar.com |
| Medium | 149477 | Dispute: Malware | 01/03/2014 15:30 GMT | Acme Inc. | 171.888.001 |
| Medium | 152472 | Fixed: Email | 01/04/2014 10:30 GMT | Acme Inc. | 123.456.789 |
| Low | 159384 | Support: Malware | 01/05/2014 09:30 GMT | General Industries | dev.foobar.com |
| Low | 160001 | Phone Support: Web | 01/06/2014 17:00 GMT | Acme Inc. | 171.888.001 |

| Dashboard | Tickets | Accounts Manager | Rule Mappings | Scan Scheduler | Assigned to: Joe Blow Security Engineer Tier 1 | Joe Blow: Tier 1 Security Engineer ▼ |

Ticket ID: #123456

Ticket type: Result (needs mapping)
Scan type: Web
Scanner: WebInspect
Scan ID: A171
Scan timestamp: 01/01/2014 23:00 GMT
Ticket timestamp: 01/02/2014 08:01 GMT Priority: High
Due Date: 01/15/2014
Account: General Industries
Asset: foobar.com
Policy: .secure
Rule in Violation: [Please map this result to the relevant rule ▼] — 1702

Result title: Apache HTTP Server httpOnly Cookie Information Disclosure

Details:
The host transmits UDP packets with a constant IP Identification field. This behavior may be exploited to discover the operating system and approximate kernel version of the vulnerable system.

Normally, the IP Identification field is intended to be a reasonably unique value, and is used to reconstruct fragment-

| ID | Scan Type | Identifier | Rule | Actions |
|---|---|---|---|---|
| 10d20d56 | Qualys | 208002 | Domain Must not be on Domain Blacklist | Edit |
| 677648ee | Qualys | 82043 | Blacklisted Services | Edit |
| 4b632362 | Qualys | 150047 | SQL Injection | Edit |
| 66fd239d | Qualys | 150071 | Cross-Site Request Forgery | Edit |
| 5ea0bda4 | Qualys | 150051 | Open HTTP Redirection | Edit |
| e9486dcc | Qualys | 86175 | Reflected Cross-Site Scripting  1802 | Edit |
| 764c1afa | Qualys | 87117 | Reflected Cross-Site Scripting | Edit |
| 977433be | Qualys | 12365 | Service Patching - Out of Date | Edit |
| ea477082 | Qualys | 12390 | Service Patching - Out of Date | Edit |
| d5deba92 | Qualys | 12445 | Service Patching - Out of Date | Edit |
| a0f1e594 | Qualys | 12524 | Service Patching - Out of Date | Edit |
| bcc82fe9 | Qualys | 12539 | Service Patching - Out of Date | Edit |
| 13d573c7 | Qualys | 12549 | Service Patching - Out of Date | Edit |

Rule: Service Patching- Out of Date        + add a policy

Applicable Policies: .trust, e-commerce, custom 1    Severity: Urgent    + add a scanner + add an identifier

Mappings
Scanner: Qualys
Identifiers:

12365: mapped 10 times (view history) |1 disputes |confidence rating: 90% | automatic approval | re-map
12390: mapped 4 times (view history) |2 disputes |confidence rating: 50% | needs review | re-map
12445: mapped 1 time (view history) |0 disputes |confidence rating: 25% | needs review | re-map
12524: mapped 5 times (view history) |1 disputes |confidence rating: 60% | automatic approval | re-map
12539: mapped 20 times (view history) |0 disputes |confidence rating: 99% | automatic approval | re-map
12549: mapped 2 times (view history) |0 disputes |confidence rating: 40% | needs review | re-map

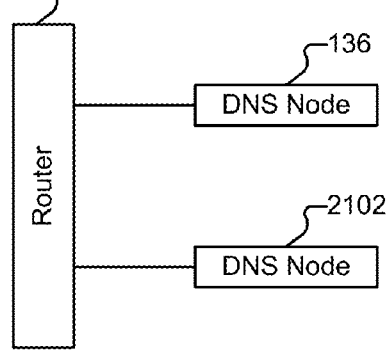
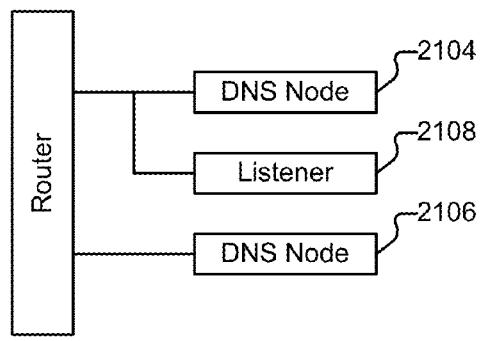
FIG. 21A  FIG. 21B
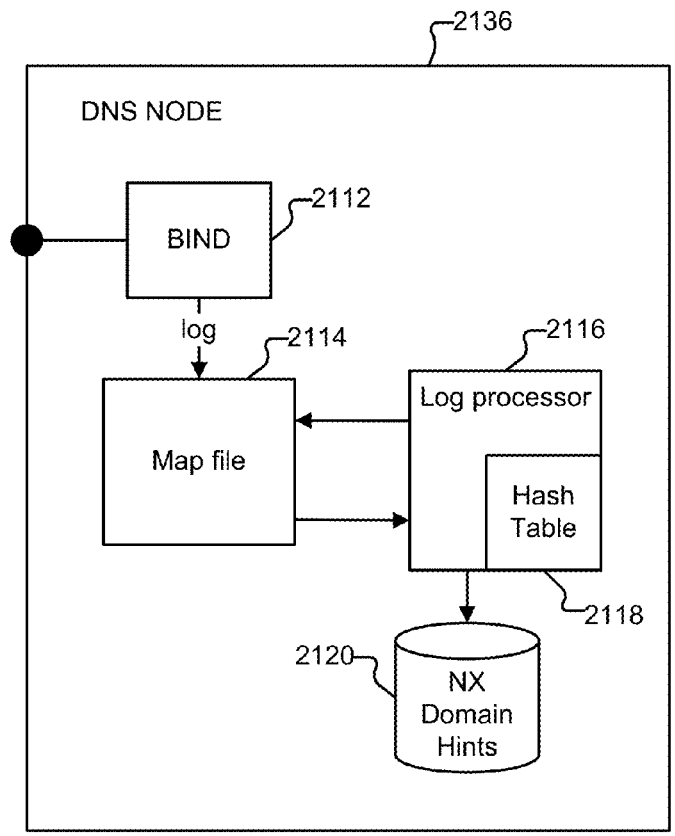
FIG. 21C

COMPUTING RESOURCE POLICY REGIME SPECIFICATION AND VERIFICATION

CROSS REFERENCE TO OTHER APPLICATIONS

This application is a continuation-in-part of U.S. patent application Ser. No. 13/444,484 entitled DOMAIN POLICY SPECIFICATION AND ENFORCEMENT filed Apr. 11, 2012 which is incorporated herein by reference for all purposes. This application also claims priority to U.S. Provisional Patent Application No. 61/823,823 entitled POLICY SCANNING filed May 15, 2013 which is also incorporated herein by reference for all purposes.

BACKGROUND OF THE INVENTION

An entity, such as large enterprise, might have written policies that govern the management of its computing resources. As one example, the enterprise might have written policies describing which sorts of applications are permitted to run on enterprise-owned servers that are accessible via the Internet. Unfortunately, such policies can be very difficult to enforce. As one example, it can be difficult for the enterprise to become aware of when a new server is brought online, and thus difficult to determine whether the new server is in compliance with applicable policies. As another example, it can likewise be difficult to know when an existing server makes available a service it did not previously offer, or makes available a service in a manner that is not consistent with the written policy. Improvements in techniques for monitoring computing systems are therefore desirable.

BRIEF DESCRIPTION OF THE DRAWINGS

Various embodiments of the invention are disclosed in the following detailed description and the accompanying drawings.

FIG. 6 illustrates an embodiment of a regime configuration interface as rendered in a browser.

FIG. 9 illustrates an embodiment of a violation interface as rendered in a browser.

FIG. 16 illustrates an embodiment of an operator interface as rendered in a browser.

FIG. 17 illustrates an embodiment of an operator interface as rendered in a browser.

FIG. 18 illustrates an embodiment of an operator interface as rendered in a browser.

FIG. 19 illustrates an additional embodiment of a regime configuration interface, as rendered in a browser.

FIG. 21A illustrates an embodiment of an environment that includes a nameserver.

FIG. 21B illustrates an embodiment of an environment that includes a nameserver.

FIG. 21C illustrates an embodiment of a nameserver.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
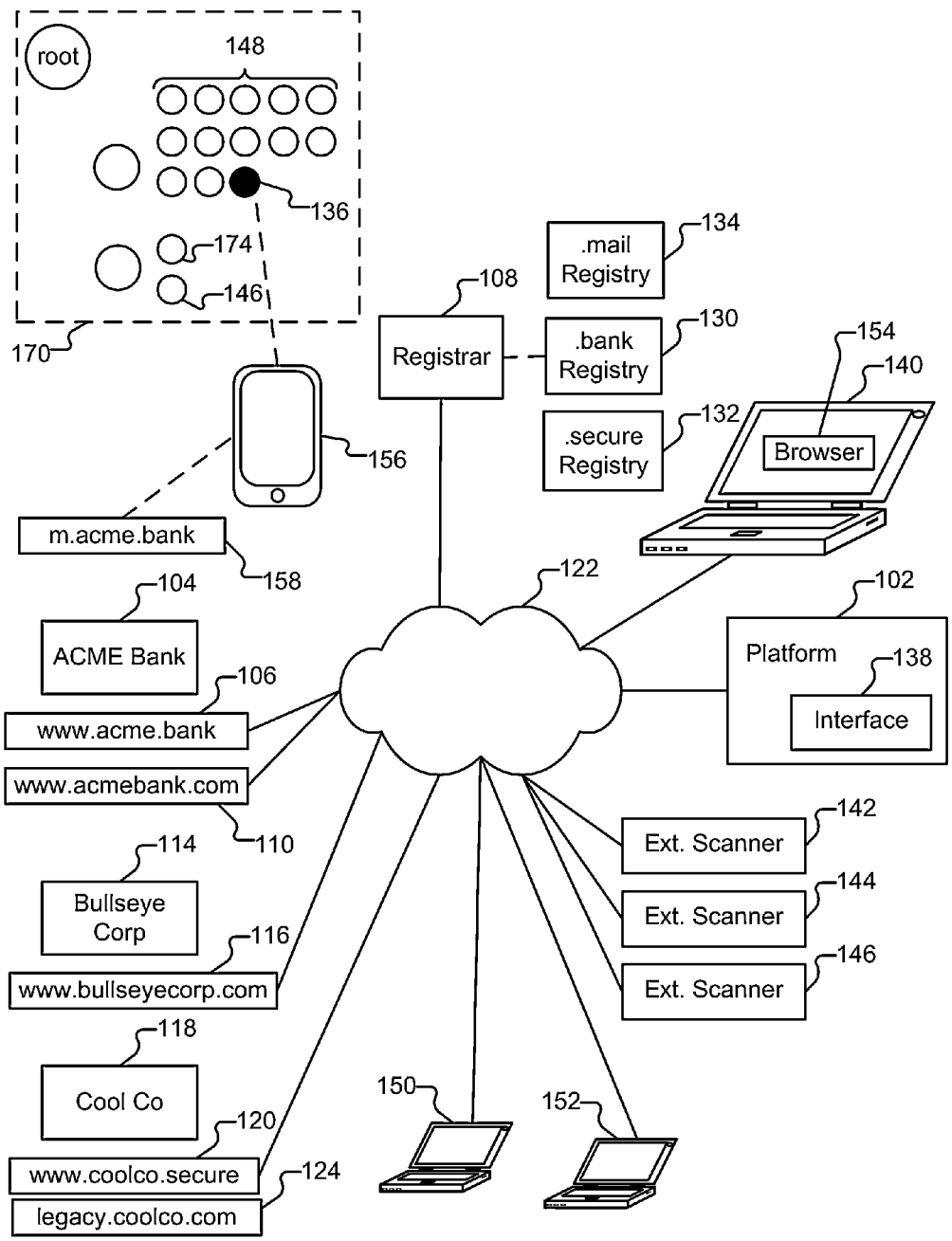
FIG. 1 illustrates an embodiment of an environment in which configurable policies can be specified and maintained, and in which computing resources are monitored for compliance with those policies.

FIG. 1 illustrates an embodiment of an environment in which configurable policies can be specified and maintained, and in which computing resources are monitored for compliance with those policies. In the example shown in FIG. 1, a bank (104), "ACME Bank," has a website reachable via one or more networks (collectively depicted in FIG. 1 as network 122) at www.acme.bank (106). The ACME Bank website provides typical online banking services to users such as Adam, who accesses site 106 with client device 140. ACME also has a website reachable at www.acmebank.com (110) that ACME uses for marketing/promotional purposes (but does not host banking services on). A retail company (114), "Bullseye Corp" has a shopping website reachable at www.bullseyecorp.com (116) that provides typical online shopping services to users. An online mail provider (118), "Cool Co" has a website reachable at www.coolco.secure (120) that provides webmail services to users. Cool Co also has a set of legacy servers, accessible at legacy.coolco.com (124).

Domain name registrar 108 is an organization that manages the registration of Internet domain names. Domain name registries 130-134 maintain databases of all domain names registered in the top level domains of ".bank," ".secure," and ".mail," respectively. As will be described in more detail below, .bank, .secure, and .mail are examples of "higher trust" top level domains (TLDs), as contrasted with traditional TLDs, such as .com and .org. Also as will be described in more detail below, a higher trust TLD can have associated with it one or more policy regimes that define a set of requirements with which any site in that TLD must comply. As used herein, a "policy regime" comprises a set of policies. The policies can be of a variety of types (e.g., web application policies, network policies, mail policies, and malware policies). Within a given policy (e.g., network policy) are a set of rules (e.g., server must deliver content via HTTPS). More stringent requirements can be defined for second level/subdomains by the owners of those domains, also as described in more detail below. User applications, such as browser 154 installed on client device 140, are configured to obtain policies (e.g., from Domain Name System 170, from platform 102 (whether directly, or via application servers, mail servers, or other servers which obtain the policies from platform 102), or other sources, as applicable). In some embodiments, the user applications facilitate communications/transactions between client device 140 and computing resources connected with higher trust domains only when the computing resources are compliant with the applicable policy regimes, in other embodiments, the user applications take other actions, such as alerting the user to policy violations, but allow communications/transactions to take place.

As will be described in more detail below, platform 102 is configured to allow users to view, create, and modify policy regimes for computing resources (also referred to herein as "assets") by interacting with interface 138. Policy regimes manipulable by users include those imposed by a TLD (if applicable) as well as any policies created by the user. Users can take further actions with platform 102 (e.g., via interface 138), such as scheduling various tests/scans and viewing corresponding results.

Platform 102 is further configured to perform tasks such as monitoring computing resources for compliance with applicable policy regimes, including by facilitating security and other testing/scanning of the computing resources. As will be described in more detail below, in various embodiments, platform 102 performs assessments of computing resources in cooperation with a plurality of external scanners (e.g., external scanners 142-146). Examples of external scanners include the Nessus vulnerability scanner developed by Tenable Network Security, the WebInspect web application security scanner developed by HP, and the QualysGuard web application security scanner developed by Qualys.

In the example shown in FIG. 1, domain name registrar 108 and domain name registry 130 comprise a "vertically integrated registry," meaning that they are under control of the same entity. Domain name registries 132 and 134 are operated separately from domain name registrar 108. In various embodiments, platform 102 (or portions thereof) is collocated with a registrar such as registrar 108, is collocated with a registry such as registry 132 (or 134), and/or operates independently (as is depicted in FIG. 1) as applicable. Further, multiple embodiments of platform 102 can exist in the same environment (e.g., with one embodiment collocated with registrar 108 and one embodiment operating separately and independently of registrar 108).

As mentioned above, ACME Bank has registered the domain "acme.bank," allowing its customers to access the bank's website at https://www.acme.bank, and to exchange email messages with the bank via the acme.bank domain (e.g., via admin@acme.bank or help@acme.bank). As a higher trust TLD, in order to register as a .bank domain, an administrator of ACME was required to submit documentation to registrar 108 or registry 130 demonstrating that ACME is a legitimate banking entity. For example, registrar 108 or registry 130 can require an ACME representative to sign a statement agreeing to comply with an acceptable use policy and acknowledging that DNS resolution services will be suspended if ACME's computing resources do not comply with certain security requirements. As a further example, as an entity purporting to be a bank, ACME can be required to provide documentation, such as a notarized copy of the bank's charter, to registrar 108 or registry 130. As will be described in more detail below, an administrator of ACME's computing resources (hereinafter referred to as "Alice") can use platform 102 to review the computing policy regime imposed by .bank to monitor ACME's compliance with the regime, and to take other actions, such as specifying more stringent requirements than those imposed by .bank. Also as will be described in more detail below, Alice can allow an auditor (e.g., employed by ACME, employed by a representative of a TLD, or employed by a different entity, such as a governmental entity) to view information on platform 102 pertaining to ACME's compliance with .bank or other policy regimes.

Different levels of validation can be required (e.g., by registrar 108, registry 130, or other entities as applicable) for different types of applicants, and/or based on the intended use of the domain. And, different TLDs can impose different registration requirements. For example, any applicant requesting a .secure domain that includes a corporation's trademarked name (e.g., "coolco.secure") can be required to provide more documentation (e.g., a copy of the company's trademark or incorporation paperwork) than an applicant requesting a .secure domain that corresponds to the name of an individual (e.g., "JohnSmith.secure"). As another example, an applicant for a .mail domain can be asked to submit a statement promising not to use the domain to send unsolicited email of any kind—a requirement that is not present for .bank applicants. As yet another example, certain TLDs, such as .com may have very minimal requirements for registration. As will be described in more detail below, owners of domains under each of the aforementioned TLDs (whether "higher trust" or traditional TLDs) can benefit from services provided by platform 102. Thus, for example, the computing resources of each of ACME Bank, Bullseye Corp, and Cool Co can be monitored by platform 102 for compliance with various applicable policy regimes.

The services of platform 102 can be engaged in a variety of ways. As one example, registrar 108 or registry 130, as applicable, can automatically bundle payment for services provided by platform 102 (or a portion thereof) into the registration fees it charges ACME Bank, and can automatically enroll applicants in platform 102's system (and/or administer platform 102's services on behalf of those applicants, as applicable). As a second example, in order to maintain a .secure domain, Cool Co can be contractually required to sign up for and maintain the services of platform 102. As a third example, Bullseye Corp can voluntarily decide to engage the services of platform 102 (i.e., without any obligations being imposed on it to do so by a third party). Bullseye Corp could also publicly agree to engage the services of platform 102 in response to a severe security breach, and make assessments of its computing resources public (e.g., via a scorecard described in more detail below). Customers of platform 102 can pay for the services of platform 102 in a variety of ways, including as a flat fee for a set of services, and by paying ala carte for particular kinds of monitoring or additional levels of service (e.g., for more frequent testing, testing supervised by a human operator, prioritization of customer jobs in any applicable queues, such as the job queue or operator queue, etc.).

Platform Overview

Figure 2:
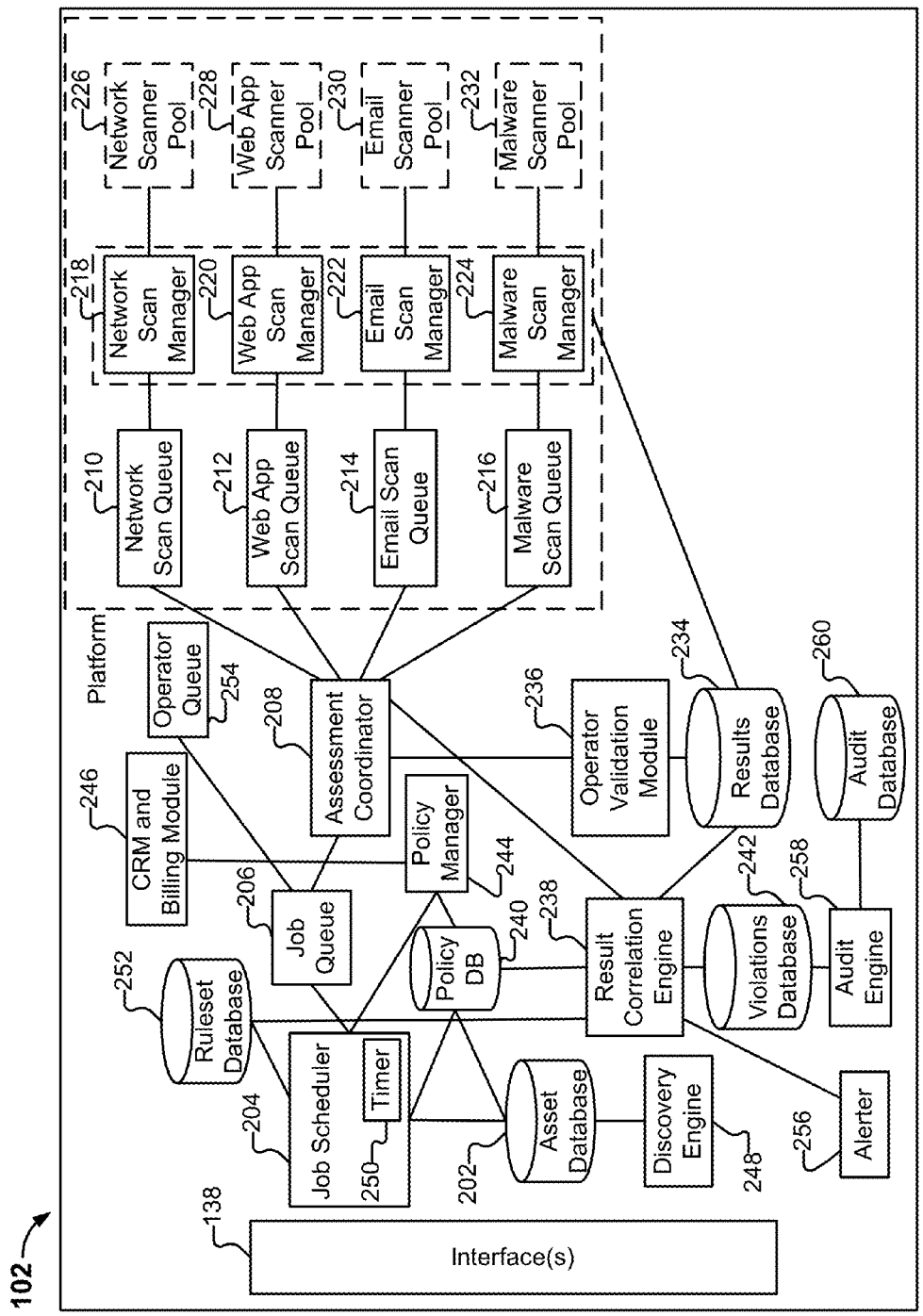
FIG. 2 illustrates an embodiment of a platform.

FIG. 2 illustrates an embodiment of platform 102. Whenever platform 102 is described as performing a task, a single component, a subset of components, or all components of platform 102 may cooperate to perform the task. Similarly, whenever a component of platform 102 is described as performing a task, a subcomponent may perform the task and/or the component may perform the task in conjunction with other components. Further, various components of platform 102 can be provided by a third party (or work in conjunction with infrastructure provided by a third party), as applicable. For example, external scanners (e.g., provided by third party vendors) are used by platform 102 in various embodiments to perform various scans. Components of platform 102 will now be described.

Platform 102 includes an interface 138 usable by customers to interact with platform 102 (e.g., via device 150). For example, customers of platform 102 can schedule assessments of computing resources and can view results of those assessments using interface 138. As will be described in more detail below, in various embodiments, platform 102 leverages human operators (whether employees, contractors, or otherwise working on behalf of platform 102) to perform certain tasks, such as authoring and maintaining test descriptions (and the code needed to implement those tests), performing tests requiring manual assessment, and evaluating completed assessments (e.g., to minimize false positives). The human operators also interact with platform 102 via interface 138. Various example interactions between users (whether customers or operators) and interface 138 are described in more detail below.

Asset database 202 stores entries of computing resources to be monitored/tested by platform 102. A variety of approaches can be used to define/store assets in database 202, and the granularity of what is defined in asset database 202 as an asset can differ in different embodiments. In some embodiments, an asset includes a DNS sub-domain, the IP addresses directly linked to the DNS sub-domain via DNS records, and IP addresses indirectly linked via the user when the asset is created in the system. In the same embodiment, an example of a sub-asset includes an IP address that belongs to an asset. In other embodiments, the computing resources described above as being "sub-assets" instead comprise the "assets." Assets can be added to asset database 202 in a variety of ways. As one example, a customer, such as Alice, can upload or otherwise provide a listing of ACME's assets (and/or sub-assets, as applicable) to asset database 202 via interface 138 (or via another appropriate mechanism). As another example, registrar 108 (or registries 132-134) can provide asset information (on behalf of multiple customers) to platform 102 for inclusion in asset database 202. Assets can also be included in asset database 202 by asset discovery engine 248, which is described in more detail below.

Figure 3:
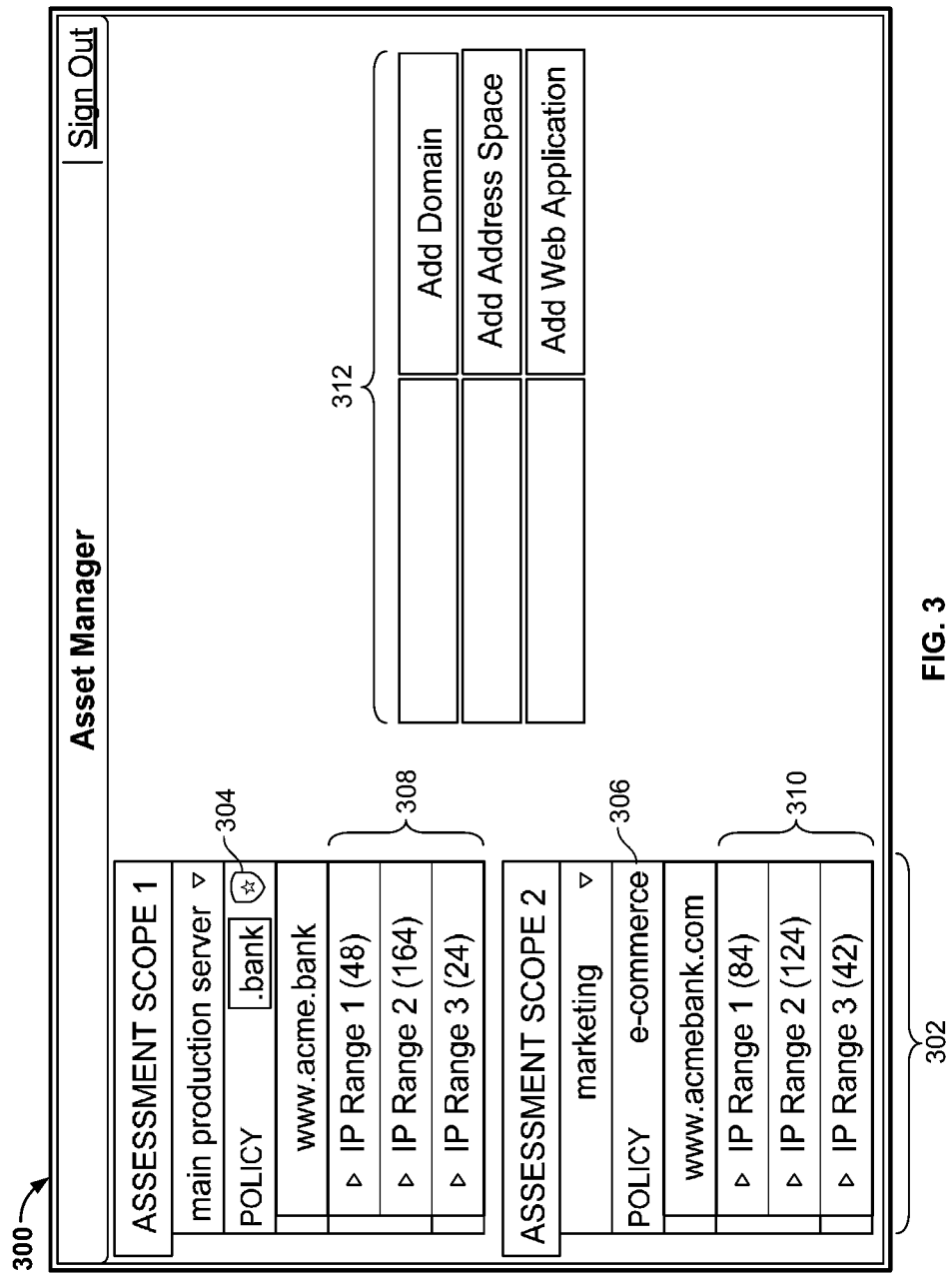
FIG. 3 illustrates an embodiment of an asset manager interface as rendered in a browser.

An example interface for viewing assets is shown in FIG. 3. In particular, FIG. 3 shows an embodiment of an interface presented to Alice when she logs into her account on platform 102. Region 302 of interface 300 depicts assets being monitored by platform 102 and the policy regimes applicable to those assets. As shown in FIG. 3, two policy regimes are in place—the ".bank" policy regime (304) for computing resources accessible via www.acme.bank, and ACME's own policy regime (306) for computing resources accessible via www.acmebank.com. The IP address ranges and number of nodes being monitored under each of the regimes are depicted in regions 308 and 310 for www.acme.bank and www.acmebank.com, respectively. Alice can add additional computing resources, and can provide information such as credentials for web applications by interacting with the fields and buttons in region 312.

As will be described in more detail below, assets (or sub-assets, as applicable) in database 202 are assigned assessment windows. In some embodiments, an assessment window is a period of time in which a complete assessment of the asset for compliance with a policy regime is to be completed (and, as applicable, the duration of time between reoccurring assessments). As one example, an assessment window for a .secure domain (such as www.coolco.secure) could be set at 24 hours, reflecting a .secure TLD policy that all computing resources accessible via *.coolco.secure be fully tested for compliance with the .secure policy regime daily. A different assessment window could be specified for a different type of domain, such as for a .mail domain (e.g., 7 days). Where the domain is voluntarily added (e.g., when Bullseye Corp engages platform 102's services—not at the requirement of a TLD), a default window can be used (e.g., 3 days) and/or the customer can specify a desired assessment window. Further, while in some embodiments, compliance with all aspects of a policy regime is tested for during the assessment window, in other embodiments, compliance with different rules or sets of rules representing portions of a regime is tested for according to different schedules (e.g., with some being assessed daily and others weekly).

Job scheduler 204 is responsible for managing job queue 206. In particular, job scheduler 204 periodically polls asset database 202 to retrieve those computing resources entering their assessment windows. Job scheduler 204 is also configured to receive, prioritize, and enqueue manually initiated scan requests (e.g., received from operators or as single vulnerability re-test requests received from customers, such as Alice).

Job queue 206 is a list of outstanding assessment jobs. The jobs are enqueued by job scheduler 204 and processed by assessment coordinator 208. Jobs can be prioritized in the queue (e.g., based on the size of the assessment window, based on level of service paid for by the customer, based on the nature of the scan, and/or other factors), in which case such jobs will be added to the beginning of the queue after any other currently queued prioritized jobs, but before any non-prioritized jobs.

Assessment coordinator 208 is responsible for delegating the work of an assessment to the corresponding scanning manager(s) to perform the work. A single assessment job can comprise tests performed by differing technologies (e.g., corresponding to the types of rules that make up a policy regime). When a new assessment job is pulled from assessment job queue 206, assessment coordinator 208 will add a job to the job queues (210-216) of the scanner managers (218-224) of the implicated technology category. As depicted in FIG. 2, examples of such technology categories include network scans, web application scans, email scans, and malware scans. Other technology categories can be included (and depicted categories omitted) in various embodiments, as applicable.

Scanner managers 218-224 are responsible for starting and monitoring scanners selected from respective pools 226-232. As shown in FIG. 2, a different scanner manager exists for each category of scanner. Scanner managers manage the number of scanners in their respective scanner pools based upon load requirements. When a given scan completes, the associated scanner manager pushes the scan results to results database 234 and signals to assessment coordinator 208 that the scan has finished. Scan managers are also responsible for handling errors (when possible) and elevating errors to assessment coordinator 208 (as required).

Results database 234 is the repository for all results obtained from scanners (e.g., scanners included in scanner pools 226-232). As mentioned above, upon completion of a given scan job, the scanner's manager will push the results to results database 234.

In some embodiments, scan results are validated by human operators. For example, when assessment coordinator 208 detects that all scanner components of an assessment have completed their work (e.g., scan managers 218-224 have completed their respective work), assessment coordinator 208 signals to operator validation module 236 to generate operator tickets for each newly discovered (i.e., not previously detected/validated) or re-opened problem. Each ticket provides all of the information that an operator will need to validate a result. Once validated, the result is flagged as such. When all results have been validated, assessment coordinator 208 is signaled that validation has completed for the given assessment job.

Once results have been (optionally) validated, result correlation engine 238 matches the results for the assessment against any applicable policies for the asset stored in policy database 240. In some embodiments, any discovered violations of policy are stored in violations database 242. Such violations can also be stored in other ways, such as in results database 234 or in asset database 202, as applicable (with violations database 242 duplicated or omitted as applicable). As will be described in more detail below, assessment results (and in particular, policy violations) can be surfaced to interested parties (e.g., via email alerts sent by alerter 256 and/or presentation in graphical interfaces), such as an administrator of the asset, a representative of the associated TLD of the asset (if applicable), or an auditor.

Example Processes

The following are various examples of processes performed in conjunction with various components of platform 102.

Creating/Editing Policy Regimes

The following is an example of a process that can be performed (e.g., by an administrator of a customer of platform 102) to set up a new policy regime or make modifications to an existing policy regime. In the following example, suppose Charlie, an administrator at Cool Co, is interacting with platform 102 on behalf of Cool Co. In this example, Cool Co's .secure computing resources are already subject to the .secure policy regime (a default template that is stored in policy database 240 and accessible to all customers of platform 102). Suppose Charlie would like to configure a different regime to be applied to a set of Cool Co's legacy servers that do not contain critical data and are not reachable at a coolco.secure subdomain, but are instead accessible via legacy.coolco.com. Note that in the following example Charlie is able to specify the rules he would like enforced (e.g., content must be delivered via HTTPS), without needing to specify how the rule is to be tested for. Instead, as will be described in more detail below, platform 102 determines the appropriate test(s) to deploy to check whether Cool Co's resources are in compliance with the regime Charlie specifies.

Figure 4:
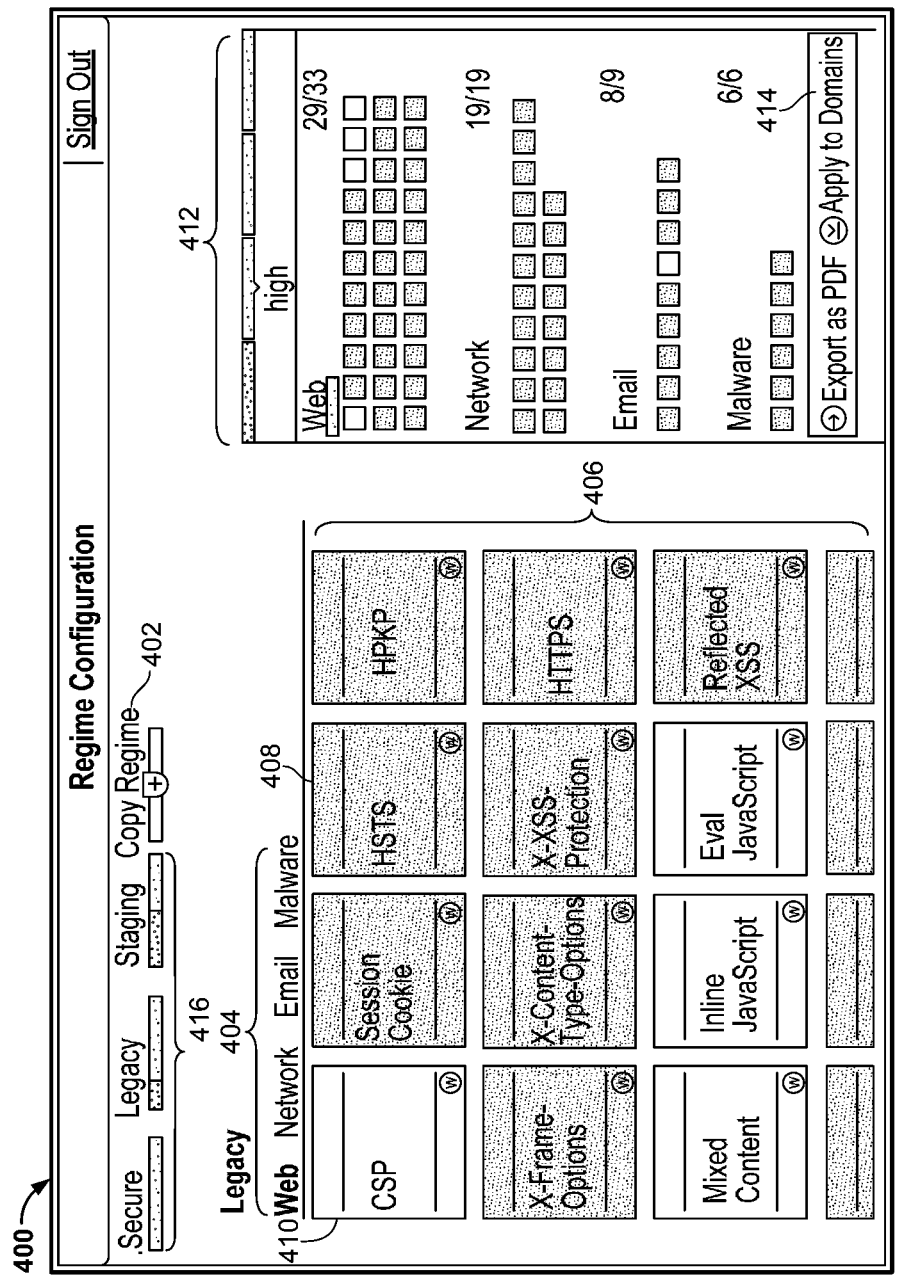
FIG. 4 illustrates an embodiment of a regime configuration interface as rendered in a browser.

Charlie begins by logging into his account on platform 102 (e.g., by using laptop 152 to communicate with interface 138). Charlie accesses policy manager 244 via interface 138. An example of a policy regime configuration interface is shown in FIG. 4. From regime configuration interface 400, Charlie can create a new policy regime, copy an existing regime, and make changes to an existing regime.

As mentioned above, in some embodiments, a policy regime includes four types of policies: Network, Web, Email, and Malware. Other types of policies can also be included, and at least some of the aforementioned types of policies can be omitted, as applicable. Policies can be added as a group from a pool of policies to the regime, or copied on a rule-by-rule basis to a new policy regime, as applicable. A given policy comprises a complete set of rules that would govern a computing resource, which rules can be grouped together according to logical/technical categories such as email, web application, malware, and network. An example rule in the Web Application technical category is "Require TLS Encryption." In the policy regime configuration interface, this rule can be abbreviated as "TLS." As will be described in more detail below, Charlie can choose which rules are enabled or disabled for his custom Legacy regime. Some rules have sub-rules (also referred to herein as "options"). For example, the "Require TLS Encryption" rule can have several sub-rules, such as "Minimum supported TLS version," "Required cipher suites," and "Disallowed cipher suites." When Charlie is satisfied with his new policy regime, he saves the policy regime (e.g., to policy database 240). If this is a modification of an existing regime, then it can be saved as a new version with the same name, with a whole version number attached.

Charlie can attach his new regime (or version thereof) to an asset (or set of assets, or set of sub-assets, as applicable) using the control provided in region 414. When attaching a regime to an asset, policy manager 244 parses the policies (and rules, and sub-rules, as applicable) included in the regime to detect which scan interval(s) will be used, such as daily or monthly. Policy manager 244 (via interface 138) then prompts Charlie to provide appropriate time details for each interval. For example, Charlie could be prompted to enter a time of day (e.g., in UTC with local time translations available) that a daily assessment should be performed. If Charlie enters 1400 UTC, then daily assessments will occur every day at that time. For monthly assessments, Charlie will be asked to pick a day of the month and a time (e.g., every first Tuesday, or every month on the 5th). For annual assessments, Charlie can be shown a calendar and asked to select a date. In various embodiments, the date/time selection dialogue shown to Charlie includes pricing information (e.g., allowing him to opt to receive a discount by selecting a less busy time, pay a premium for a more popular time, etc.). A mapping between assets (stored in asset database 202) and policies (stored in policy database 240) is stored in asset database 202.

One example of a policy regime is the following, an example of a policy regime imposed on computing resources accessible via any .secure domain. The following policy regime reflects a minimum set of requirements applicable to all assets (of all customers of platform 102) accessible via .secure domains, including www.coolco.secure. Customers can choose to implement more stringent versions of the .secure policy regime for their .secure assets, if desired.

Example Regime

.secure

A. Network Policy

1. Must provide Route Origin Authorizations (ROA) for AS's hosting .secure hosts (rfc6482).
2. Must provide BGPSEC signed route updates for AS path validation (draft-ietf-sidr-bgpsec-protocol-07). BGPSEC mandates a single suite of cryptographic algorithms due to a need for global agreement: ECDSAP256SHA256.
3. Must provide DNSSEC signed records within the .secure DNS zone.
Appropriate signing algorithms include: RSASHA1, RSASHA1-NSEC3-SHA1, RSASHA256, RSASHA512, ECDSAP256SHA256, and ECDSAP384SHA384.
4. Must take steps towards minimizing DNS amplification DDoS attacks from DNS servers within .secure.
  a. Must not offer recursive resolution by caching DNS servers for requests from unauthorized hosts.
  b. Must not offer recursive resolution by authoritative DNS servers.
  c. May provide response rate limiting for authoritative DNS servers.
5. Must not offer zone transfers to unauthorized hosts.
6. Must filter inbound ICMP messages at network edge firewalls.
7. Must filter outbound type 3 "unreachable" ICMP messages at network edge firewalls.
8. Must not perform traffic filtering strictly depending on originating source port.
9. Must perform traffic filtering to ports not offering an allowed service.
10. For all hosts in designated supporting IP ranges or those with a .secure DNS record.
  a. Must offer services solely over TLS, DTLS, START-TLS, SSH, or IPsec.
    i. An exception is made for HTTP on port 80 which only offers a 301 redirect to HTTPS.
    ii. An exception is made for SMTP for traffic from non-.secure domains.
  b. The following services are explicitly allowed to be exposed to the Internet on .secure hosts: DNSSEC, HTTP/HTTPS, SMTP/SMTP with STARTTLS/SMTPS, IMAP with STARTTLS/IMAPS, and POP3 with STARTTLS/POP3S.
  c. The following services are explicitly forbidden from being exposed to the Internet on .secure hosts: SQL Databases (Microsoft SQL, Oracle SQL, MySQL, MariaDB, PostgresSQL, etc.), Key-Value Stores (Redis, Cassandra, CouchDB, MongoDB, etc.), Remote Access Services (rsh, rlogin, rexec, Telnet, VNC, Terminal Services, etc.), and Network File Systems (NFS, CIFS, AFS, etc.).
  d. All other services will be flagged for further review when first detected:
    i. A map of approved services will be maintained for each host.
    ii. Accepted services will be added to the list of approved services.
    iii. Rejected services will be flagged as an unnecessary service which should be eliminated.
11. For all hosts in designated supporting IP ranges and which do not have a .secure DNS record.
  a. The following additional services are explicitly allowed:
    i. SSH version 2
      1) Must not offer compatibility with SSH version 1.
      2) Allowed encryption algorithms: aes128-gcm@openssh.com, aes256-gcm@openssh.com, aes128-ctr, aes192-ctr, aes256-ctr, aes128-cbc, aes192-cbc, aes256-cbc.
      3) Allowed MAC algorithms: hmac-sha2-256-etm@openssh.com, hmac-sha2-512-etm@openssh.com, umac-128-etm@openssh.com, hmac-sha1-etm@openssh.com, hmac-sha2-256, hmac-sha2-512, umac-128@openssh.com, and hmac-sha1.
    ii. SSL-based VPN
    iii. IPsec-based VPN
12. Must apply Operating System patches for actively exploited security vulnerabilities.
13. Must apply Operating System remaining security patches.
14. Must apply Application and Service patches for actively exploited security vulnerabilities.
15. Must apply Application and Service remaining security patches.

An appropriate certificate is one for which (rfc6125):
  a. The current date falls within the certificate's validity period.
  b. The SubjectAltName must match the target DNS hostname and the Subject CN may match the target DNS hostname.
  c. The certificate chain terminates at an approved root CA.
  d. A TLSA DANE record for either CA constraints or service certificate constraints is present.
  e. Basic Constraints, Name Constraints, and Key Usage restrictions are met.
  f. Has not been revoked.
  g. The key size is at least 2048 bits in size.

Appropriate TLS parameters are:
  a. Support for TLS1.0, TLS1.1 and TLS1.2.
  b. No support for SSL2.0, SSL3.0.
  c. Must use one of the following ciphersuites:
TLS_DHE_DSS_WITH_AES_128 CBC_SHA,
TLS_DHE_DSS_WITH_AES_256 CBC_SHA,
TLS_DHE_RSA_WITH_AES_128_CBC_SHA,
TLS_DHE_RSA_WITH_AES_256_CBC_SHA,
TLS_ECDHE_RSA_WITH_AES_128_CBC_SHA,
TLS_ECDHE_RSA_WITH_AES_256_CBC_SHA,
TLS_ECDHE_ECDSA_WITH_AES_128_CBC_SHA,
TLS_ECDHE_ECDSA_WITH_AES_256_CBC_SHA,
TLS_DHE_RSA_WITH_AES_128_CBC_SHA256,
TLS_DHE_RSA_WITH_AES_256_CBC_SHA256,
TLS_DHE_RSA_WITH_AES_128_GCM_SHA256,
TLS_DHE_RSA_WITH_AES_256_GCM_SHA384,
TLS_DHE_DSS_WITH_AES_128_CBC_SHA256,
TLS_DHE_DSS_WITH_AES_256_CBC_SHA256,
TLS_DHE_DSS_WITH_AES_128_GCM_SHA256,
TLS_DHE_DSS_WITH_AES_256_GCM_SHA384,
TLS_ECDHE_RSA_WITH_AES_128_CBC_SHA256,
TLS_ECDHE_RSA_WITH_AES_256_CBC_SHA384,
TLS_ECDHE_RSA_WITH_AES_128_GCM_SHA256, TLS_ECDHE_RSA_WITH_AES_256_GCM_SHA384,
TLS_ECDHE_ECDSA_WITH_AES_128_CBC_SHA256,
TLS_ECDHE_ECDSA_WITH_AES_256_CBC_SHA384,
TLS_ECDHE_ECDSA_WITH_AES_128_GCM_SHA256,
TLS_ECDHE_ECDSA_WITH_AES_256_GCM_SHA384.

Appropriate IPsec parameters are:
a. No support for IKE Aggressive Mode.
b. Must use one of the following ciphersuites for IKE.
c. Must use one of the following ciphersuites for AH/ESP.

B. Web Application Policy

1. Must be served solely over HTTPS.
   a. A listener on HTTP is allowed to perform a 301 redirect to HTTPS.
   b. Must offer an appropriate X.509 certificate as defined in the Network Policy.
   c. Must use appropriate TLS protocol parameters as defined in the Network Policy.
   d. Must offer TLS session resumption.
   e. Must not support client initiated renegotiation.
   f. Must support secure renegotiation (RFC 5746).
   g. Must not include sub-resources loaded from non-HTTPS.
2. Must provide an appropriate HTTP Strict Transport Security (HSTS) HTTP header.
3. Must provide an appropriate HTTP Public Key Pinning (HPKP) HTTP header.
4. Must provide an appropriate Content-Security Policy 1.0 (CSP) HTTP header.
5. Must provide an appropriate X-Frame-Options HTTP header.
6. Must provide an appropriate X-Content-Type-Options HTTP header.
7. Must provide an appropriate X-XSS-Protection HTTP header.
8. Must not include unsafe JavaScript constructs and design patterns in referenced script
   a. Must not include script content defined inline, e.g.:
      i. <script>/*JavaScript Source*/</script>
      ii. <img onerror="/*JavaScript Source*/"/>
      iii. <a href="javascript:/*JavaScript Source*/">...</a>
   b. Must not use eval JavaScript constructs, e.g.:
      i. eval( )
      ii. Function( )
      iii. setTimeout( ) with non-callable first parameter
      iv. setInterval( ) with non-callable first parameter
9. Must not serve applications which contain cross-site scripting (XSS) vulnerabilities:
   a. Applications must not include reflected XSS vulnerabilities.
   b. Applications must not include stored XSS vulnerabilities.
   c. Applications must not include DOM-based XSS vulnerabilities.
10. Must not serve applications subject to cross-site request forgery (CSRF) vulnerabilities.
11. Must not serve applications which contain SQL injection vulnerabilities.
12. Must not serve applications which contain HTTP header injection vulnerabilities.
    a. Applications must not include Request Smuggling vulnerabilities.
    b. Applications must not include Response Splitting vulnerabilities.
13. Must not serve applications which contain Shell Command or Process injection vulnerabilities.
14. Must not serve applications which contain Code Execution vulnerabilities.
15. Must not serve applications which contain LDAP injection vulnerabilities.
16. Must not serve applications which contain Directory Traversal vulnerabilities.
17. Must not serve applications which contain XML injection vulnerabilities.
18. Must not serve applications which contain XPATH injection vulnerabilities.
19. Must not serve applications which contain XML External Entity expansion vulnerabilities.
20. Must not serve applications which contain XML Recursive Entity expansion vulnerabilities.
21. Must not serve applications which contain Open Redirects.
22. Must not serve content from user home directories (e.g.: https://www.example.secure/~username).
23. Must not serve directory index pages.
24. Must provide a crossdomain.xml file at the server root, even if there is no Flash content.
25. Must provide a clientaccesspolicy.xml file at the server root, even if there is no Silverlight content.
26. Must protect application cookies.
    a. Must specify the http only flag on session cookies.
    b. Must specify the secure flag on all cookies.
    c. Must not specify the domain or path attribute on cookies.
27. Must use strong session identifiers.
    a. Must use session identifiers that are sufficiently large.
    b. Must use session identifiers that are sufficiently unpredictable.
    c. Must update session identifiers stored in cookies whenever authentication level changes.
    d. Must not place session identifiers within URLs.
28. Must provide an inactivity timeout of no more than 60 minutes.
29. Must host user uploaded content from a separate domain.

C. Email Policy

1. Must provide Sender Policy Framework (SPF) DNS records.
2. Must provide DomainKeys Identified Mail (DKIM) DNS records.
3. Must provide Domain-based Message Authentication, Reporting & Conformance (DMARC) DNS records.
4. Must constrain email DNS records (SPF, MX, etc.) within the .secure TLD or with approved providers.
5. Must attempt STARTTLS or SMTPS for outbound SMTP connections to any non-.secure domains.
6. Must offer STARTTLS and SMTPS for inbound SMTP connections from any non-.secure domains.
   a. Must use appropriate TLS protocol parameters as defined in the Network Policy.
   b. Must offer an appropriate X.509 certificate as defined in the Network Policy.
7. Must use STARTTLS or SMTPS for outbound SMTP connections to any .secure domains.
   a. Must drop connection if STARTTLS is not offered.
   b. Must use appropriate TLS protocol parameters as defined in the Network Policy.
   c. Must perform appropriate certificate validation as defined in the Network Policy.

8. Must provide STARTTLS and SMTPS for inbound SMTP connections from any .secure domains.
   a. Must ignore all commands except for HELO/EHLO prior to receiving a STARTTLS command.
      i. Return "530 Must issue a STARTTLS command first"
   b. Must use appropriate TLS protocol parameters as defined in the Network Policy.
   c. Must offer an appropriate X.509 certificate as defined in the Network Policy.
9. Must provide PGP or S/MIME email signatures on email from the designated domain contact or group.
10. Must support PGP or S/MIME encrypted email on email to the designated domain contact or group.
11. Must provide PGP or S/MIME email signatures on email from the designated security contact or group.
12. Must support PGP or S/MIME encrypted email on email to the designated security contact or group.
13. Must comply with the CAN-SPAM Act.
14. Must not have SMTP servers that provide open relay functionality exposed to the Internet.
15. Must not have SMTP servers present on common spam blacklists. Examples of such lists include: Barracuda RBL (b.barracudacentral.org), SORBS (dnsbl.sorbs.net), SpamCop (bl.spamcop.net), SpamHaus Zen (zen.spamhaus.org), and Tiopan (bl.tiopan.com).

D. Malware Policy

1. Must not directly host or link to known malware. (Content will be compared to known malware by signature comparison.)
2. Must not attempt to automatically install malware on end-user machines. When accessing sites:
   a. No changes should be made to the registry.
   b. No changes should be made to the filesystem (outside of cache and temp directories).
   c. No unexpected processes should be launched.
   d. No ActiveX controls on the kill-bit list should be loaded.
   e. No ActiveX controls marked unsafe for scripting should be loaded.
   f. Must not include JavaScript which updates page content from obfuscated source material (e.g. fromCharCode).
   g. Must not include <script> tags with excessive URL encoded src attributes.
   h. Must not include <iframe> tags with excessive URL encoded src attributes.
3. Must not redirect or link to sites which attempt to install malware on end-user machines.
4. Hostnames in the .secure namespace must not appear on domain blacklists.
5. Must not redirect or link to sites which appear on domain blacklists.
6. Must not host executable content without valid code signatures:
   a. Include authenticode signature for Windows executable content (.exe, .msi, .msp, etc.).
   b. Include code signatures for Mac OS X executable content (.app, etc.).
7. Must not host "dangerous" content types, which includes: .com, .cpl, .hta, .jar, .msc, .pif, .scr, .bat, .cmd, .ps1, .ps1xml, .ps2, .ps2xml, .psc1, .psc2, .vb, .vbe, .vbs, .ws, .wsc .wsf .wsh, .reg, etc.

Returning to the example of FIG. 4, Charlie arrived at the view shown in interface 400 after clicking "Copy Regime" button 402 to make a copy of the ".secure" policy regime and renaming the copy "Legacy." Charlie can switch between the different policy regimes of concern to Cool Co's various computing resources by interacting with region 416. While viewing a particular regime, Charlie can switch between views of each of the policy sub-types or technical categories (Web Application, Network, Email, and Malware) and the rules included in those technical categories by selecting the appropriate technical category in region 404. In the example shown in FIG. 4, Charlie is viewing rules pertinent to the Web Application policy sub-type. Charlie can enable and disable particular rules by clicking on the various boxes depicted in region 406. Enabled rules are depicted as dark boxes (e.g., box 408), and disabled rules are depicted as light boxes (e.g., box 410). Each box shown in region 406 (or viewable by scrolling down in interface 400) corresponds to a single rule. For example, box 410 (disabled) corresponds to the "Must provide an appropriate Content-Security Policy 1.0 (CSP) HTTP header" rule, required for web applications running under a .secure domain. As Charlie is configuring his new Legacy regime, he has opted to disable this particular rule (as indicated by the box being light colored). Box 408 (enabled) corresponds to the "Must provide an appropriate HTTP Strict Transport Security (STS) HTTP header" rule, also required for applications running under a .secure domain. Charlie has decided to maintain compliance with this rule (as indicated by the box being dark colored) for resources he designates as belonging to the legacy group. In region 412, Charlie is presented with an overview of which rules in a given policy are enabled and which are disabled (e.g., with 29/33 rules being enabled for web applications).

Figure 5:
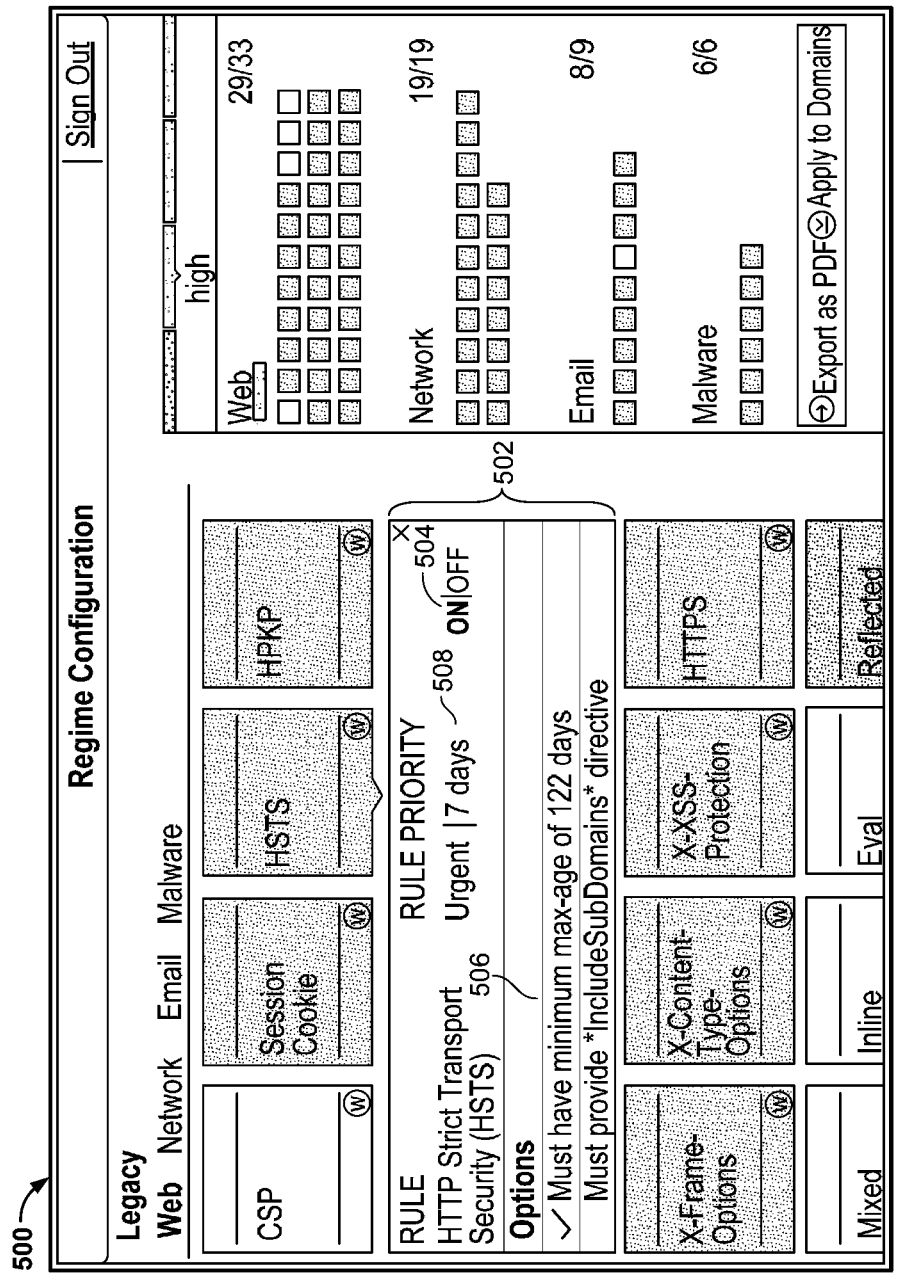
FIG. 5 illustrates an embodiment of a regime configuration interface as rendered in a browser.

Charlie can click on an individual rule (e.g., rule 408) to configure it. FIG. 5 illustrates an embodiment of interface 400 after Charlie has clicked on box 408. Information pertaining to rule 408 appears in region 502 of interface 500, such as a text description. Charlie can enable and disable the application of rule 408 to Cool Co's legacy servers by clicking on the appropriate option in region 504. For some rules, such as rule 408, sub-rules or options are available. Charlie can selectively enable the sub-rules by interacting with region 506. Disabled rules (e.g., rule 410) do not allow sub-rules to be set, since they will not be enforced. For each rule, Charlie can also set an enforcement timeline by interacting with region 508 (choosing, e.g., from hourly, daily, weekly, bi-weekly, monthly, semi-annual, and annual testing periods). Charlie can also make other selections, as applicable, such as setting a priority for the rule, having a human verify results of the rule (or a computer perform the verification), setting alerts in case of rule violations, etc.

In various embodiments, a default package of scanning services is provided by platform 102 (e.g., as part of a fixed monthly or annual fee). As one example, holders of .secure second-level domains can pay a fixed annual fee for daily scanning of assets (e.g., as part of the registration fee of a .secure second-level domain). In various embodiments, the amount of the annual fee is scaled based on the number of computing resources reachable via the second-level domain. Customers, such Cool Co, can also elect to pay additional fees for additional services (e.g., more frequent scanning than the default, more detailed scanning results than the default, human verification of any detected violations, etc.). As one example, customers can pay additional fees (e.g., surge pricing) to be given priority over other customers during times of heavy demand on platform 102 (e.g., leading up to holiday shopping periods, or after significant security vulnerability disclosure events, such as the Heartbleed OpenSSL Bug vulnerability). Similarly, customers can be offered discounts for scheduling services to be performed during times of less demand (e.g., complete assessments performed January 1 can be priced at a discount compared to the default assessment price). As another example, a customer such as Bullseye can pay a premium to explicitly include tests that cannot be performed automatically, such as testing for business logic flaws in web applications (e.g., parameter tampering bugs) being performed by an operator. As yet another example, a customer (e.g., Bullseye) can hire an operator to write a new test (e.g., that is unique to the customer's infrastructure) and include it in platform 102 (e.g., by adding data associated with the new test to ruleset database 252 and policy database 240, and linking the test to customer assets in asset database 202). In various embodiments, customers are offered packages of services (e.g., a web application scanning package offered at a first price). If the customer chooses to add a second package (e.g., by adding malware scanning services), the customer's existing policy regime(s) can automatically be revised to enable the additional scanning services.

In various embodiments, for each change Charlie makes to a policy regime, a running estimate of cost is dynamically generated (e.g., by module 246) and shown to him. This price reflects the type of testing necessary for each enabled rule and the frequency chosen for testing. For example, a rule that requires significant human intervention will cost more than one that is completely automated. Likewise, having a test run daily will cost more than having it run monthly. As yet another example, some tests may require (or otherwise make use of) external scanners (such as external scanners 142-146). The vendors of those scanners may charge a premium for use of the external scanners, which can be passed on to the customer of platform 102 as applicable. The price is an estimate, based upon a base definition of an asset. In some embodiments, complicated assets are associated with custom pricing rules and the final price will be displayed and confirmed later by the user.

FIG. 6 shows an example of a policy regime configuration interface in which custom pricing information is depicted. In particular, interface 600 is an example of an interface that is shown in various embodiments to Charlie after Charlie decides to enable rule 410 and make modifications to the default configuration for the rule. In particular, as indicated in region 602, Charlie has decided that testing for the rule should be performed weekly, instead of the default of testing once per month (costing an additional $250 per month, as indicated in region 604). As indicated in region 606, Charlie has turned off some of the sub-rules pertinent to rule 410 (resulting in a savings of $100 per month, as indicated in region 608). The total financial impact of Charlie's potential modifications to scanning for compliance with rule 410 is depicted in region 610. Finally, by selecting "Accept and confirm" in region 612, Charlie can indicate his approval of the charges/changes.

In various embodiments, a policy regime can be set at different points in the DNS hierarchy and can be used by domains at a higher-level in the hierarchy (e.g., third-level domain can use its second-level domain's policy regime, which has already been configured). For example, Alice can configure a policy regime (e.g., the ".bank plus" policy regime) for www.acme.bank using the process described above when she sets up www.acme.bank as a computing resource on platform 102. If Alice later wishes to apply platform 102's services to www.uat.acme.bank, she can choose to apply the .bank plus policy regime to www.uat.acme.bank.

When Charlie is finished revising his Legacy policy regime, platform 102 will calculate and present the final cost of monitoring the applicable assets for compliance with the regime to Charlie, based on factors such as the complexity of the regime and asset(s) to which it is assigned. Charlie accepts this price, which completes attachment to the asset(s), or Charlie rejects it, which cancels the attachment.

Policy manager 244 writes the regime details and mappings into policy database 240. It also informs job scheduler 204 that there are new events to schedule, and pushes cost data to CRM and billing module 246 for billing.

Figure 7:
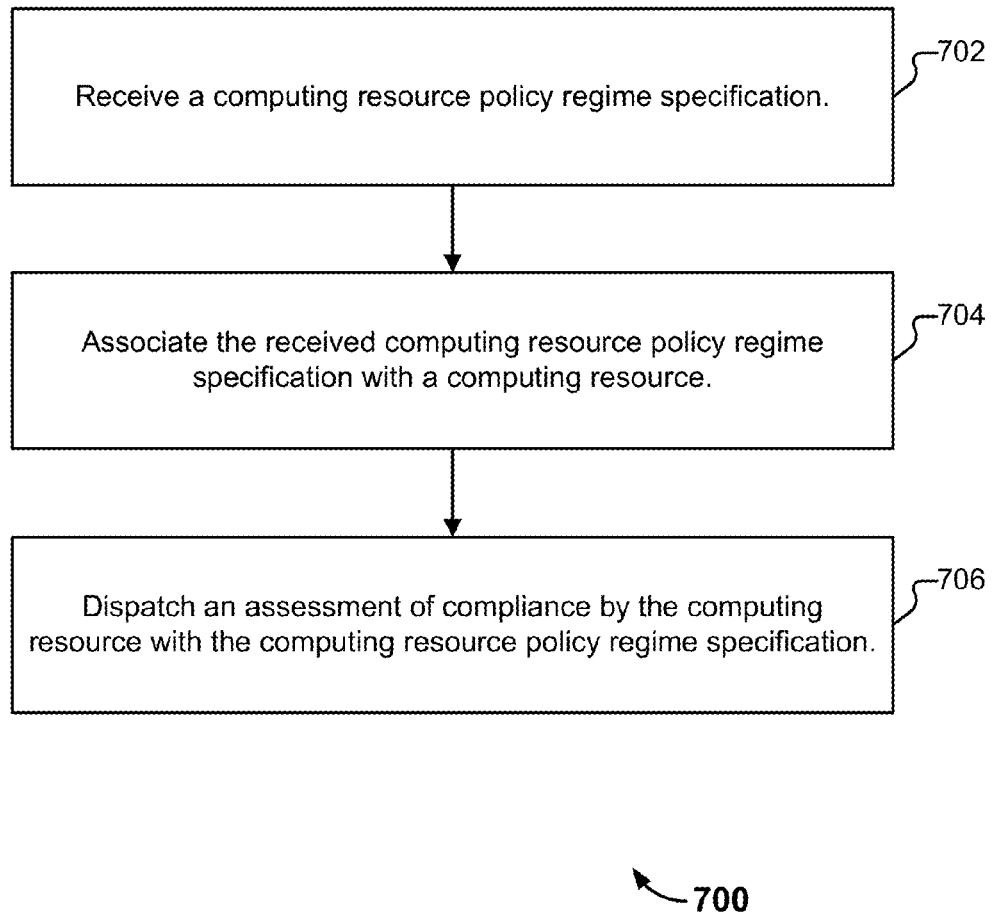
FIG. 7 illustrates an embodiment of a process for creating a computing resource policy regime and assessing whether a computing resource is in compliance with the regime.

FIG. 7 illustrates an embodiment of a process for creating a computing resource policy regime and assessing whether a computing resource is in compliance with the regime. In various embodiments, process 700 is performed by platform 102. The process begins at 702 when a specification of a computing resource policy regime is received (e.g., by platform 102 via interface 138). As one example, a policy regime is received at 702 when Charlie duplicates the existing copy of the .secure regime to make a Legacy regime (e.g., by clicking button 402) and accepts pricing to allow the Legacy regime to be attached to computing resources (e.g., by clicking button 612). As another example, a policy regime (.secure) is received at 702 when Cool Co first sets up an account with platform 102 and indicates that it has computing resources with a coolco.secure domain.

At 704, the received computing resource policy regime is associated with a computing resource. As one example, Charlie's Legacy policy regime is associated with various computing resources when he interacts with button 414 (e.g., after completing any edits he chooses to make to the regime). As mentioned above, in various embodiments, an association between each of the designated computing resources and the policy regime is stored in asset database 202 (or any other appropriate location, such as policy database 240). Finally, at 706, an assessment of compliance by the computing resource with the policy regime is dispatched. As one example, suppose Charlie's Legacy policy regime has an assessment window of one day. Once a day, the assessment will be dispatched (706). In various embodiments, assessments are dispatched (e.g., at 706) in accordance with the following.

Dispatching an Assessment

Job scheduler 204 includes a timer 250 that tracks all upcoming scan events (e.g., scheduled assessments) for all users of platform 102. At each time interval, timer 250 looks to see if a scan event is scheduled. If a scan event is scheduled, timer 250 alerts job scheduler 204 accordingly. Job scheduler 204 receives a message from the timer specifying the time interval (daily, monthly) and the asset name. Job scheduler 204 reads and parses the policy for that asset from policy database 240.

Next, job scheduler 204 dispatches a dependency test set (also referred to herein as a pre-scan). This is a set of pretests that will reveal basic facts about the asset upon which other tests will rely. Example dependency tests include a list of all open TCP ports, and the types of software used to write a web application (e.g., Struts). The results from the dependency test set are returned and parsed by job scheduler 204, which uses the results in determining a test set to dispatch. As one example, suppose a regime requires that (where deployed), a server must run a secure version of SSH (i.e., a particular version number or higher). During the pre-scan, if Nmap reports that TCP port 22 is not open, testing for SSH (i.e., including SSH tests in the test set) can be omitted. As another example, suppose a policy regime specifies various rules (e.g., within the network policy sub-type) for how a website is to serve content (including, e.g., protocols used, cipher suites used, etc.). If a given computing resource does not provide web services (e.g., as determinable by the pre-scan not finding an open port 80 or port 443), platform 102 can omit website-related testing from its assessment of the computing resource. In addition to saving computing resources of platform 102 (e.g., by not dispatching meaningless tests), money can also be saved by omitting unnecessary tests. As one example, suppose external scanner 142 is a web application scanner and further suppose that the vendor of web application scanner 142 charges a fixed fee per API call that it receives from platform 102 (e.g., received from a scanner included in pool 228). If the resource being assessed does not offer web services, then an API call to scanner 142 wastes money.

Job scheduler 204 pulls a mapping of rules to tests from ruleset database 252. The mapping indicates, for a given rule, which tests potentially could be performed. In some cases, testing a computing resource for compliance with a given rule is straightforward. For example, a rule requiring that a web application have a particular version number (or higher) could be tested for by a simple script that polls the application for its version number. In that case, a single test may exist for the rule, and the mapping for that particular rule leads to the single test. Other rules, however, such as a rule requiring that the content of a website not include malware, or a rule that a web application not be subject to known SQL injection attacks, may require hundreds or thousands of different tests to be performed. That is, the presence of any one of a hundred known bugs in the application—each with its own detection test—should result in a single rule violation. In this scenario, the single rule may have thousands of tests mapped with it in ruleset database 252. In addition, at least some tests may require the scanning services of third party external scanners, such as scanners 142-146. Ruleset database 252 includes, for each rule included in the database, information such as which tests are applicable to a given rule, and under what circumstances (e.g., using test A to test compliance with rule 408 for Apache web servers and test B to test compliance with rule 408 for IIS web servers). Database 252 can further include scripts/code (e.g., executable by nodes included in pools 226-232) for executing each test. Further, ruleset database 252 can include information about how results for rules requiring multiple tests should be combined (i.e., rules for scoring, weighting, or otherwise combining multiple results for a single test). In various embodiments, contents of the ruleset database are created and maintained by operators (or other employees) of platform 102. Contents of ruleset database 252 can also be administered by other entities. For example, a third party service can provide the contents of ruleset database 252 and maintain it as a subscription, and/or can contribute to its contents. As new flaws/exploits are discovered, tests can be revised and/or rule definitions updated as applicable (whether by operators of platform 102 or other appropriate entities). The ruleset database 252 houses access control information usable to identify users who are permitted to edit data and features contained within the database.

Job scheduler 204 creates a scan job (also referred to herein as a test set), comprising the individual tests required to determine compliance by a computing resource with the rules included in the policy regime. As mentioned above, tests can involve different levels of human interaction. For example, tests can be any of the following types:

a. Completely automated—These tests are dispatched to assessment coordinator 208, and the results routed directly to results database 234.

b. Automated with human component—These tests are also dispatched to assessment coordinator 208, but the results are routed to operator validation module 236 for verification first. Operator validation module 236 maps data stored in results database 234 and operator access controls (e.g., included in database 252 or stored in a different location, as applicable) to determine which tickets to display to which operators.

c. Human driven—These tests generate tasks sent to operator queue 254 directly for fulfillment by operators.

Job scheduler 204 generates the test set for each rule activated in the policy regime (e.g., each rule applicable to the computing resource(s) being assessed, as determined based on pre-scanning) and any sub-rule settings, then optimizes the test set using the dependency results. Tests that do not make sense, e.g., due to the non-existence of services or a mismatch of software platforms (e.g., based on metadata obtained from the testing target) are not added to the test set. Further, since multiple rules can rely upon the same tests, job scheduler 204 also optimizes the test set to eliminate duplicate tests. Finally, job scheduler 204 dispatches the tests to job queue 206.

As explained above, assessment coordinator 208 pulls jobs from job queue 206 and delegates them to the corresponding scanning manager(s) (e.g., scanning managers 218-224). The implicated scanning manager(s) then manage the performance of the applicable scans by scanners selected from pools 226-232. Scans can be performed by scripts/programs internal to platform 102, and can also be sent to external scanners. For example, as applicable, scanners in pools 226-232 can use APIs made available by external scanners 142-146, respectively, to obtain scan results from those external scanners. In some embodiments, external scans are sent by scan managers 218-224, by assessment coordinator 208, or by another component (e.g., a scan manager dedicated to coordinating external scan requests) in addition to or instead of such scans being sent by scanners in pools 226-232, as applicable. Further, as also explained above, human driven tests can be dispatched directly to operator queue 254 for handling by operators.

Figure 8:
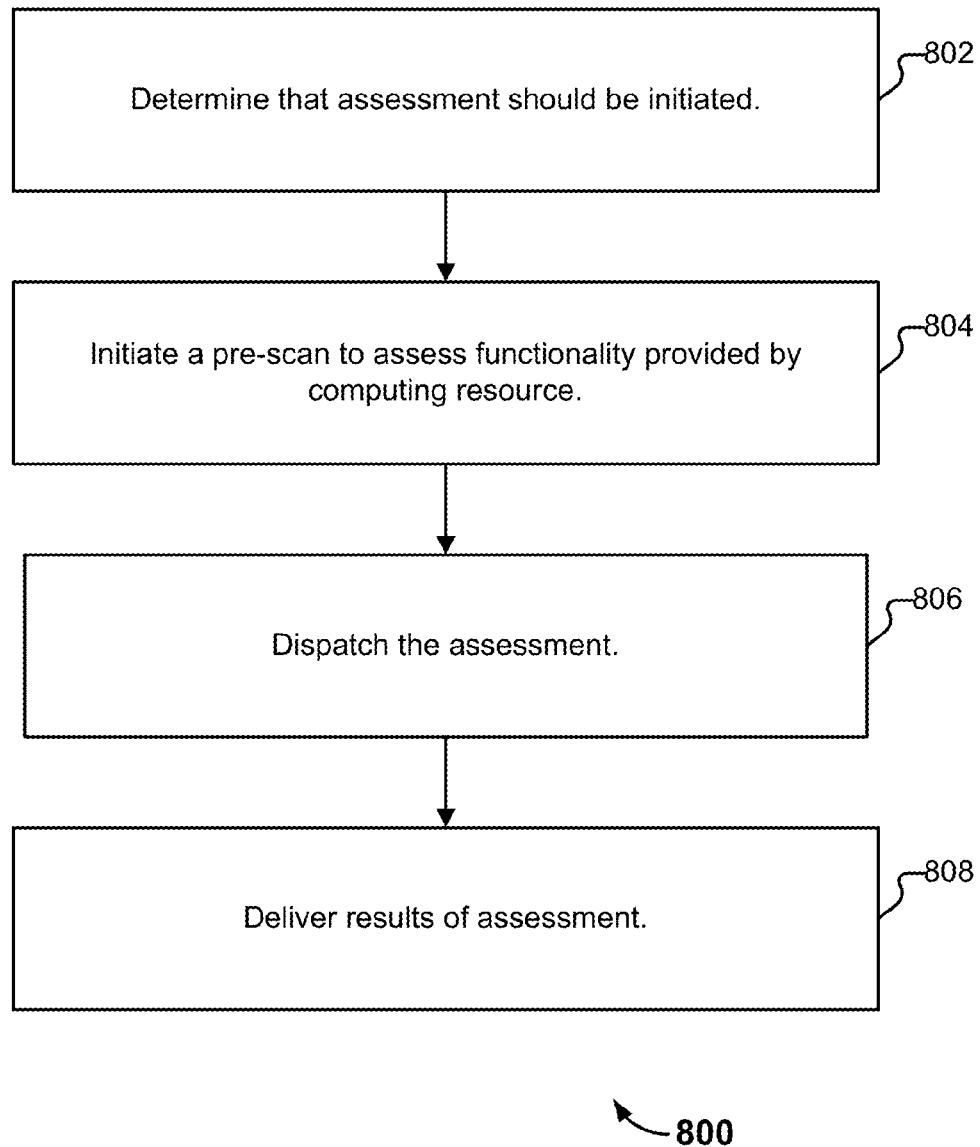
FIG. 8 illustrates an embodiment of a process for assessing a computing resource for compliance with a computing resource policy regime specification.

FIG. 8 illustrates an embodiment of a process for assessing a computing resource for compliance with a computing resource policy regime specification. In various embodiments, process 800 is performed by platform 102. The process begins at 802 when a determination that an assessment should be initiated is made. As one example, suppose a requirement of .bank is that all computing resources accessible via a .bank second-level domain must be checked for compliance with .bank's computing resource policy regime once per day. Further suppose that Alice has configured (via interface 138) ACME's daily scan to run at 1200 UTC. Prior to 1200 UTC, (at portion 802 of process 800), timer 250 determines that an assessment of ACME's .bank asset (e.g., all of those nodes depicted in region 308 of FIG. 3) should be initiated. At 804, a pre-scan is initiated. As one example, each of the computing resources accessible via *.acme.bank is given an Nmap and/or other scan to determine information such as: which TCP ports are open, a platform fingerprint (e.g., including metadata information such as operating system and version information; hardware information), and which types of software were used to write any web applications made available by those computing resources. As explained above, the results of the pre-scan can be used to customize which tests will be dispatched. At 806, the assessment is dispatched. For example, at 806 a test set is added to job queue 206 for handling by assessment coordinator 208. Finally, at 808 results of the assessment are returned. In various embodiments, results are processed (e.g., at 808) in accordance with the following.

Processing Scan Results

Results of scans are provided to results database 234. In some cases, at least two individual results (e.g., from the performance of multiple tests) may be required to evaluate compliance with a single rule with respect to a given computing resource. And, those individual results may arrive asynchronously. In some embodiments, result correlation engine 238 periodically checks results database 234 to determine whether a sufficient number of results have been returned to evaluate the rule (e.g., based on the rule-test mapping and/or other information stored in ruleset database 252). Once a sufficient number of results has arrived in results database 234, result correlation engine 238 matches the results against the rule definition from the ruleset database and determines whether a policy violation has been found.

Each finding of a violation has an associated confidence rating based on confidence ratings of any specific scans that are associated with the violation. For some rules, a single positive result indicates that the rule has been violated. Other rules require more sophisticated parsing of the results, for example with multiple tests being weighted or combined using logic stored in the ruleset database 252 (or any other appropriate storage location).

Individual Confidence Results

In the case of finding a violation of a rule that has a single test result, one way to determine the confidence rating is to determine a ratio based on the success rate of the test in the past. For instance, if a particular test has run ten times in the past, and has successfully identified a problem nine times, with one time being a false positive, that would be a 90% success rate (and a confidence rating for that test of 90%).

One way the confidence rating can be used is to provide it as information to an operator to assist the operator when validating findings of violations (i.e., to help the operator determine whether a violation is a false positive). Another way the confidence rating can be used is, in the event the confidence rating for a test exceeds a threshold, the finding of a violation can automatically bypass human operator verification that might otherwise be required. In various embodiments, the threshold is configurable by the operator team, by the customer, or by a third party (e.g., a representative of .bank or .secure) as applicable. In some embodiments, a minimum number of results for a given test must be collected before platform 102 will calculate a confidence rating for the test.

Combined Confidence Ratings

In the event there are multiple scans associated with a finding of a violation, in some embodiments, only the results from scans that are above the confidence threshold set by the operator team are taken into account. Each result above the threshold votes for the end result by (e.g., applying its confidence rating percentage against a single vote) either adding or subtracting its vote from the total. A result that finds a violation will add its result, and a result that finds no problem subtracts. If the final vote is greater than zero, it is considered a positive result and bypasses human verification. If the result is less than or equal to zero (as would be the case in a tie), the result does not bypass human verification. Other approaches can also be used. The following are example scenarios:

Scenario One:
Confidence rating threshold: 80%
Scan 1 finds a problem: 95% confidence rating
Scan 2 finds a problem: 50% confidence rating
Scan 3 finds no problem: 60% confidence rating
Scan 4 finds no problem: 85% confidence rating The only scans that are above the threshold are scans 1 and 4. The final vote tally adds 0.95 for scan 1 and subtracts 0.85 for scan 4. The final tally is 0.1, and as it is greater than zero, the positive finding is considered valid and bypasses human verification.

Scenario Two:
Confidence rating threshold: 80%
Scan 1 finds a problem: 85% confidence rating
Scan 2 finds no problem: 30% confidence rating
Scan 3 finds no problem: 70% confidence rating
Scan 4 finds no problem: 55% confidence rating In this scenario only scan 1 is greater than the threshold so only it is taken into account. The final tally is 0.85 and the positive finding is considered valid and bypasses human verification.

Scenario Three:
Confidence rating threshold: 80%
Scan 1 finds a problem: 90% confidence rating
Scan 2 finds a problem: 85% confidence rating
Scan 3 finds a problem: 70% confidence rating
Scan 4 finds no problem: 55% confidence rating In this scenario scans 1 and 2 are above the confidence rating and the final tally is 1.75 (0.9+0.85) and the finding bypasses human validation.

Scenario Four:
Confidence rating threshold: 80%
Scan 1 finds a problem: 85% confidence rating
Scan 2 finds no problem: 90% confidence rating
Scan 3 finds a problem: 70% confidence rating
Scan 4 finds no problem: 85% confidence rating In this scenario, scans 1, 3, and 4 are above the threshold. The final tally is −0.9 (0.85−0.9−0.85) and the finding requires human validation in order to conclude there is a rule violation.

Violations

Violations of policy rules can be handled in a variety of ways. As one example, alerter 256 can be instructed by result correlation engine 238 to alert the customer's administrator (e.g., Alice, Bob, or Charlie, as applicable) using the administrator's preferred communication technique (e.g., email, phone, and/or text message), based on information stored about the administrator with module 246. As another example, a request to investigate the violation can be simultaneously added to operator queue 254 to be addressed by an operator, and/or can be sent to operator queue 254 prior to alerting the customer's administrator. An operator will take the information in the test result and perform manual steps to verify or disprove that a rule was violated. If the operator determines that the rule was indeed violated, then a note to that effect (or a flag, or other indicator, as applicable) can be made in the result's entry in results database 234 (i.e., that the result has been verified by a human operator). The customer can then be alerted to the violation (e.g., via alerter 256) and can view information about the violation via interface 138. If the operator determines that the rule was not violated, or that the test result was faulty, then the result can be flagged as a false positive needing investigation (e.g., by the next available operator, or by an engineering team). Once the cause of the false positive is determined, appropriate changes can be made to ruleset database 252 to reduce false positives, and/or adjustments can be made to the test's confidence rating, as applicable.

FIG. 9 illustrates an embodiment of a violation interface as rendered in a browser. In the example shown, Alice is viewing a list of all active rule violations, across all ACME.bank assets. In this view, the violations are ordered by how long the user has to mitigate the issue per the policy regime, with a live countdown clock on each violation. As described in more detail below, a variety of actions can be taken in response to the finding of a violation, including (in some embodiments) giving the customer a finite amount of time after which DNS query services will be suspended. The letter in the bottom right corner of each box indicates which policy sub-type has been violated: network, web, email or malware. So, for example, testing has revealed that ACME's server v2.acme.bank is serving an application which contains an SQL injection vulnerability, as indicated in box 902. If Alice wishes to see more detail about a violation, she can click on the violation box (e.g., box 902), taking her to the view shown interface 1000.

Figure 10:
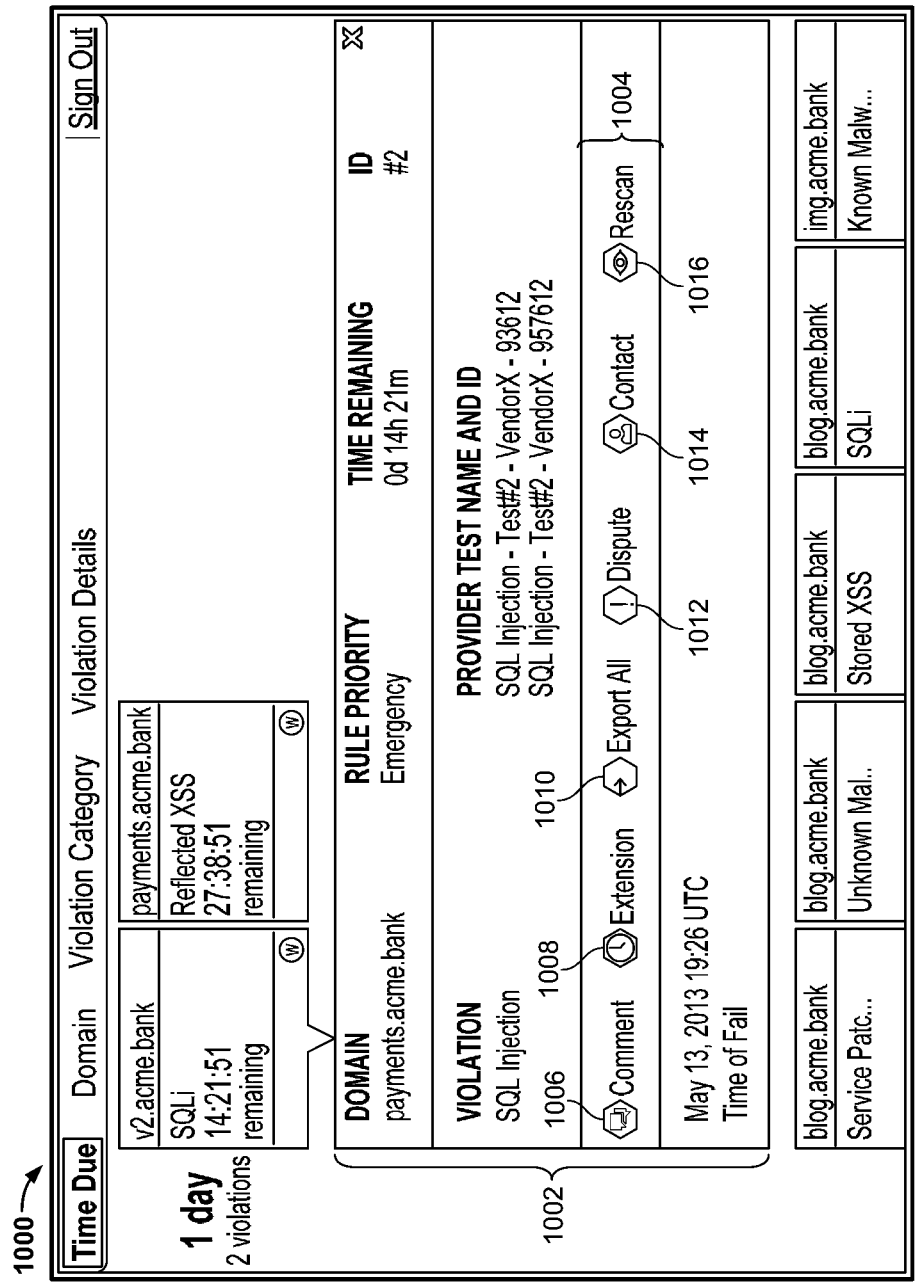
FIG. 10 illustrates an embodiment of a violation interface as rendered in a browser.

FIG. 10 illustrates an embodiment of interface 900 after Alice has clicked on box 902. Additional information pertaining to the violation is shown in region 1002, including the name of the rule, in this case "SQL Injection." Clicking on the rule name takes Alice to a text description of the rule. Also visible is the list of test results that triggered this violation, encoded with the name of the test provider ("VendorX"), test name ("SQL Injection") and a unique per-result ID (e.g., "93612"). Clicking on a test result brings up a modal window with details on the test result, including the test payload and full response. Alice can interact with platform 102 using the buttons shown in region 1004. Examples of interactions include commenting on the violation (1006), asking for more time to mitigate (1008), exporting the violation detail (1010), disputing the accuracy of the report (1012), requesting contact from the operator team (1014), and ordering a rescan (1016). Alice can request additional information (or help) in the form of written communication, live chat, and/or a phone consultation. In the event Alice chooses to dispute the violation (e.g., by clicking on button 1012), the violation finding will be placed in operator queue 254 for investigation. If Alice believes the violation has been resolved (i.e., she has corrected the problem on ACME's infrastructure), she clicks on button 1016, which causes platform 102 to send a message to job scheduler 204 that a retest of this specific issue should be performed. Job scheduler 204 will then dispatch the appropriate test set to job queue 206. Any change to the state of a rule violation will trigger an alert to the user, e.g., sent by alerter 256.

Auditor View

As mentioned above, platform 102 allows a user, such as Alice, to designate third parties as auditors to fulfill audit requirements of customers, regulators, or affiliates (or for other reasons). One way Alice can add an auditor is to navigate to a user management interface provided by interface 138. Alice selects an "Add a user" option and provides the email address of the auditor. Alice further indicates that the new user should have a user type of "Auditor" (e.g., by selecting from a dropdown list of user types). Alice can optionally specify what types of assets the auditor is allowed to see. So, for example, where ACME has assets both under the .bank and under the .com TLDs, Alice could elect just to allow the auditor to examine ACME's .bank assets. The auditor selected by Alice receives an email notification that the auditor has been added as a user to ACME's account (and, if the auditor does not already have an account on platform 102, the auditor is prompted to create one). Once the auditor logs in, the auditor is presented with an interface such as is shown in FIG. 9. In some embodiments, e.g., where representatives of .bank work with platform 102, certain auditors (e.g., auditors working on behalf of .bank) are automatically added to ACME's account and automatically granted the ability to see an audit view of ACME's .bank resources.

Figure 11:
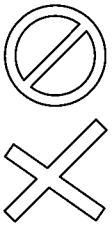
FIG. 11 illustrates an embodiment of an auditor interface as rendered in a browser.

On a regular basis, audit engine 258 queries violations database 242 for new violations of policy. Taking into account these violations, violation history, and the per-asset policy settings, and any inputs from operators of platform 102 (which inputs can override all automated data), audit engine 258 decides whether the asset is out of compliance. If so, audit engine 258 updates audit database 260. When an auditor for an asset logs into platform 102, a dashboard view using data from audit database 260 is presented to the auditor. An example auditor dashboard is shown in FIG. 11. As shown in interface 1100, the auditor dashboard allows the auditor to see multiple organizations at once (e.g., ACME and Cool Co), without logging in as separate users or navigating to separate views (where multiple organizations have given authorization to the same auditor). The auditor dashboard shows a list of every asset that auditor has the permission to view, grouped by organization. In various embodiments, this list can be filtered to only show certain organizations, show only assets attached to certain policies, or by text string. Using colors, the auditor dashboard highlights which assets are currently in violation of their attached policy. The auditor user can mouse-over an asset, getting a pop-up menu that allows them to see, to the extent which the auditor has permission, more information about alerts or the details of the attached policy. To the extent the auditor has permission, the auditor has a view to see the history of compliance with a policy. In some embodiments, the auditor does not have the ability to see the details of a violation, only the type of violation (Network, Web, Email, Malware) and the severity. This prevents the auditor dashboard from being used to find exploitable flaws.

In various embodiments, platform 102 also makes available a public scorecard with information on domains in higher trust TLDs, such as the .secure and .bank domain. This scorecard can include verified registrant information (WHOIS), verified contact information, and the current status of the domains' compliance with the security policies of those higher trust TLDs. In various embodiments, the public score card provides less information than the auditor interface (e.g., does not show historical information, and does not allow the user to drill down into violation details). Also, as mentioned above, customers of platform 102 can voluntarily make available scorecards pertaining to their computing resources. So for example, after a severe computer security breach has occurred at Bullseye (gaining negative public attention), Bullseye could elect to make available a public scorecard via platform 102, allowing members of the public to gain confidence that Bullseye infrastructure has been secured or has a history of responsibly addressing security issues.

Operator View

Figure 12:
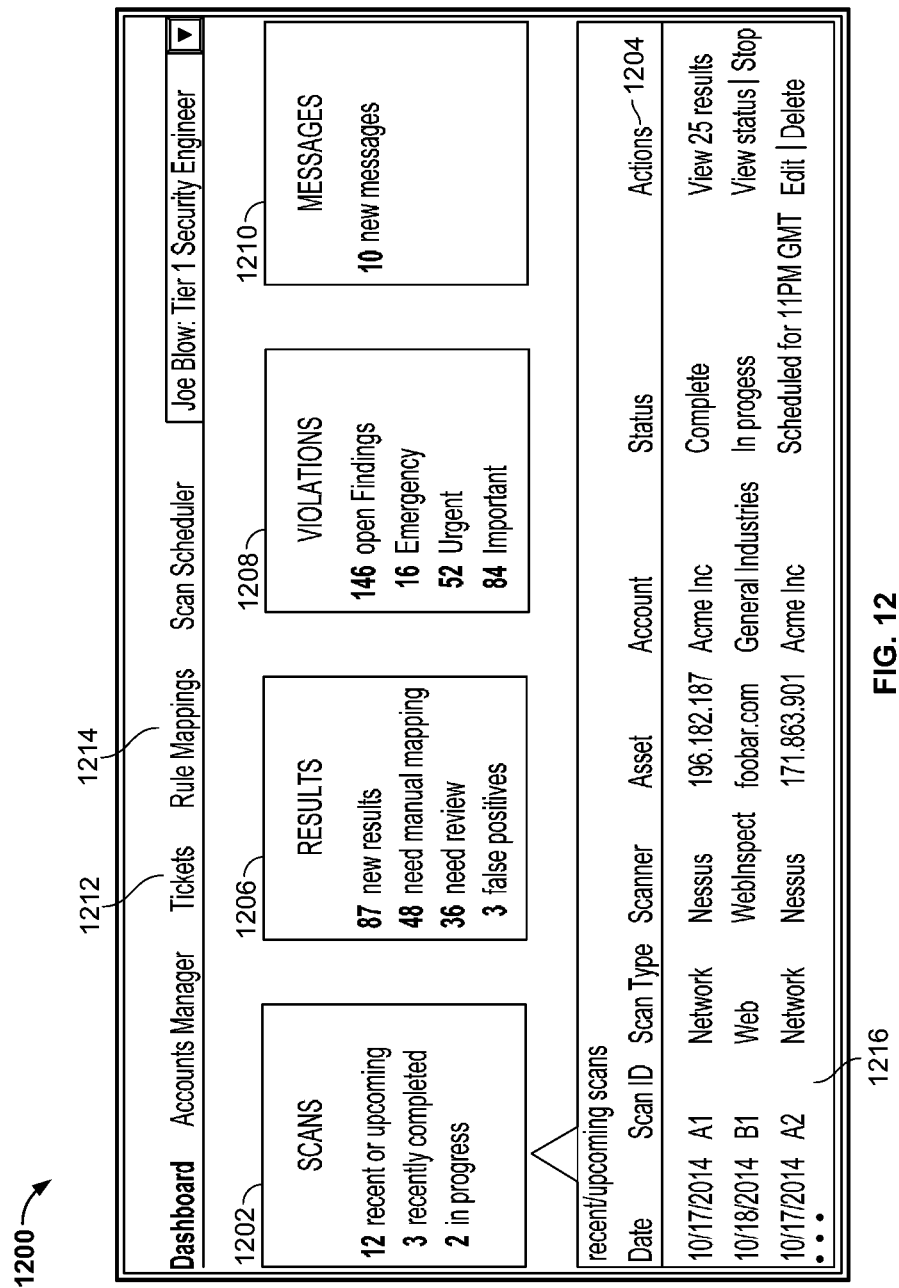
FIG. 12 illustrates an embodiment of an operator interface as rendered in a browser.

FIGS. 12-18 illustrate embodiments of an operator interface as rendered in a browser. In FIG. 12 an operator, Joe, is viewing a dashboard. In dashboard 1200 he can see a tally of scheduled, in progress, and recently completed scans (1202). By clicking on region 1202, Joe expands the region to reveal details about scheduled, in progress, and recently completed scans (1216). In this expanded region (1216), Joe can take actions (1204) with respect to those scans, such as cancelling scheduled scans, checking on the status of or stopping in-progress scans, or reviewing the results of the recently completed scans. A summary of results needing examination by Joe is presented in region 1206, a summary of violations is presented in region 1208, and a summary messages from customers relating to findings of violations is presented in region 1210.

Figure 13:
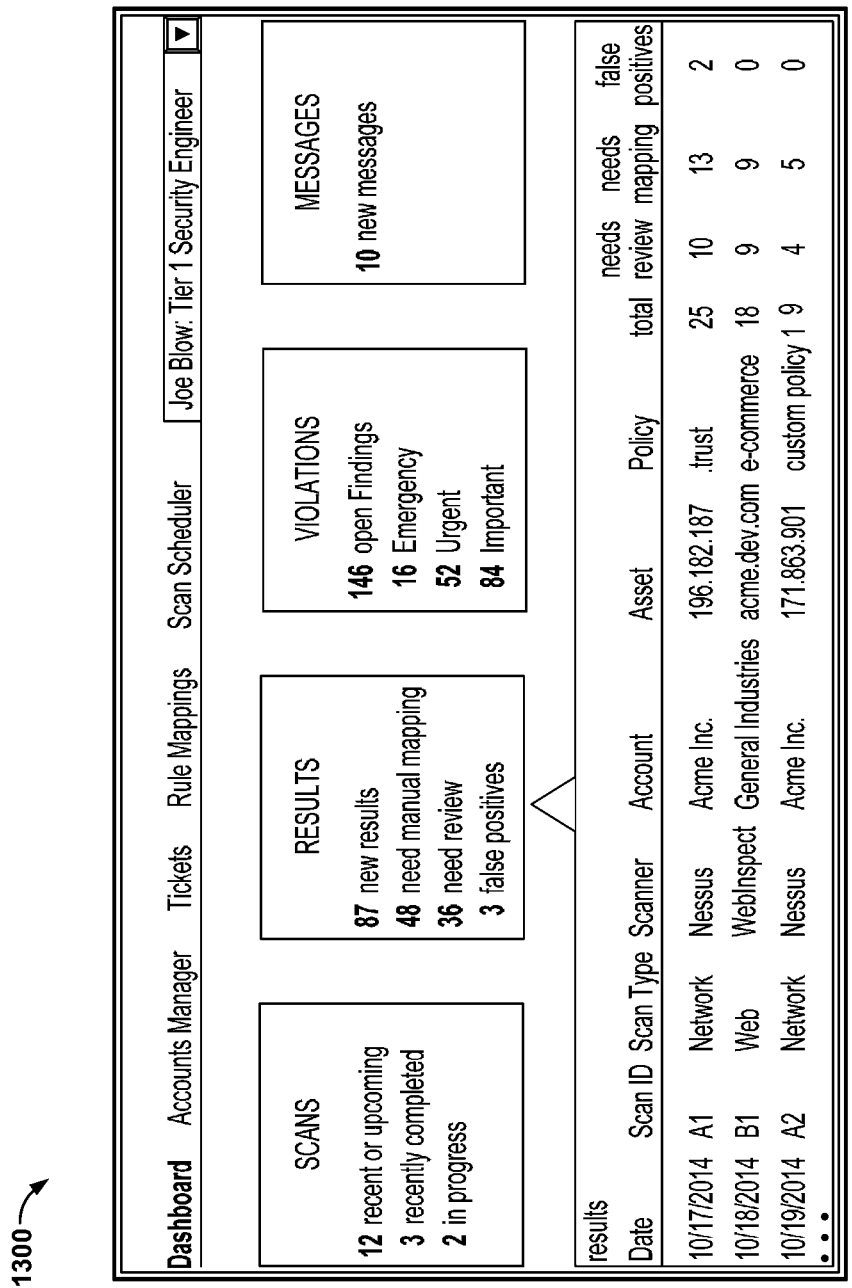
FIG. 13 illustrates an embodiment of an operator interface as rendered in a browser.

In FIG. 13, Joe has clicked on region 1206 of interface 1200 and is being shown interface 1300 as a result. In interface 1300, Joe is shown detail about results needing examination by operators of platform 102. In some embodiments, certain results that Joe views through interface 1300 are presented to him specifically by operator queue 254 while other results can be viewed by select groups of operators (e.g., those with specialized knowledge for verifying certain rules) and still other results can be viewed by all operators. For results that are viewable by only one operator, the result will remain active until the assigned operator takes appropriate action to close it (e .g, by examining the result and verifying the result is not a false positive). For results that are viewable by more than one operator, the result will remain active until an operator self-assigns the result to himself and takes the appropriate action to close it. Operators can take action to view and close results from interface 1300 or from interface 1600, described below.

Figure 14:
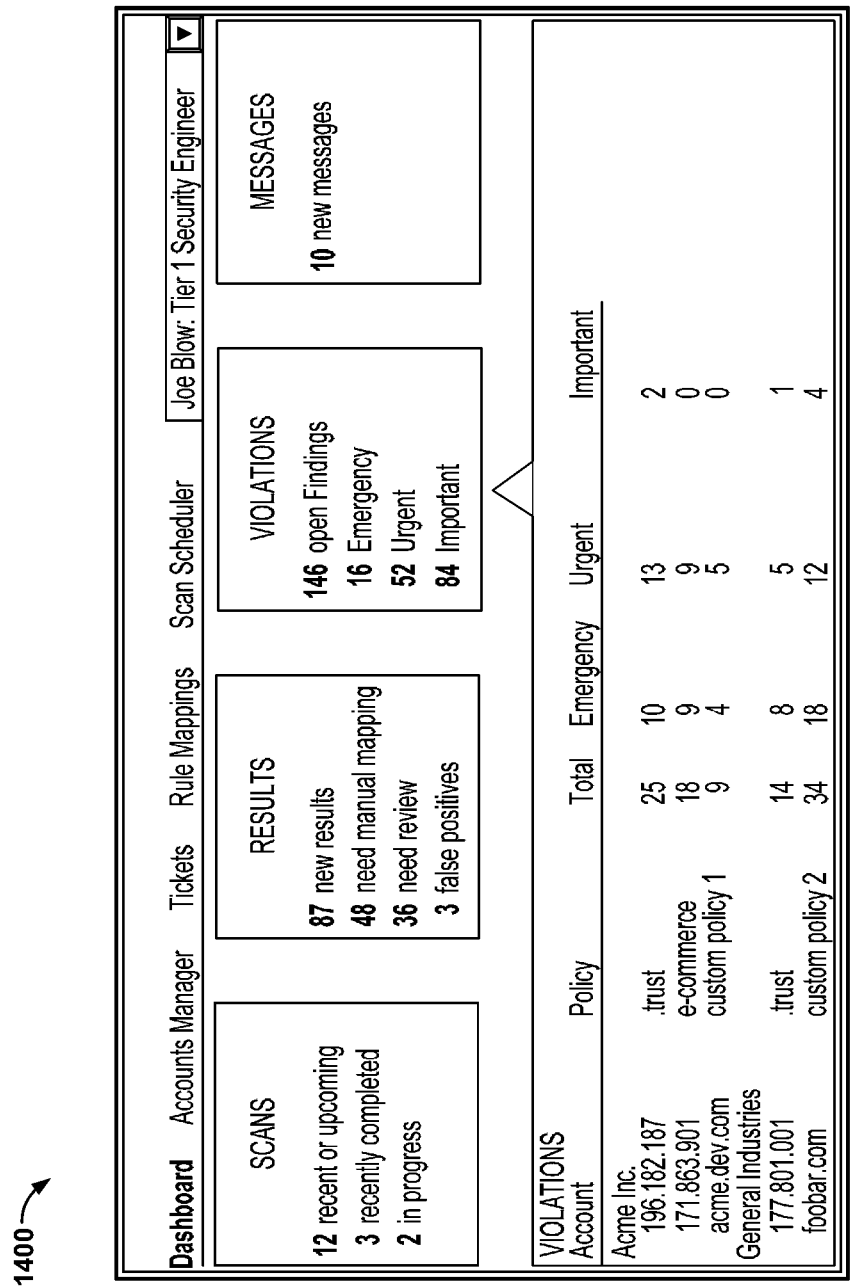
FIG. 14 illustrates an embodiment of an operator interface as rendered in a browser.

In FIG. 14, Joe has clicked on region 1208 of interface 1200 and is being shown interface 1400 as a result. In interface 1400, operator validation module 236 displays detail about recently found rule violations for which Joe has permission to view, each rule violation of which is referenced by its violation identification number at 1502.

Figure 15:
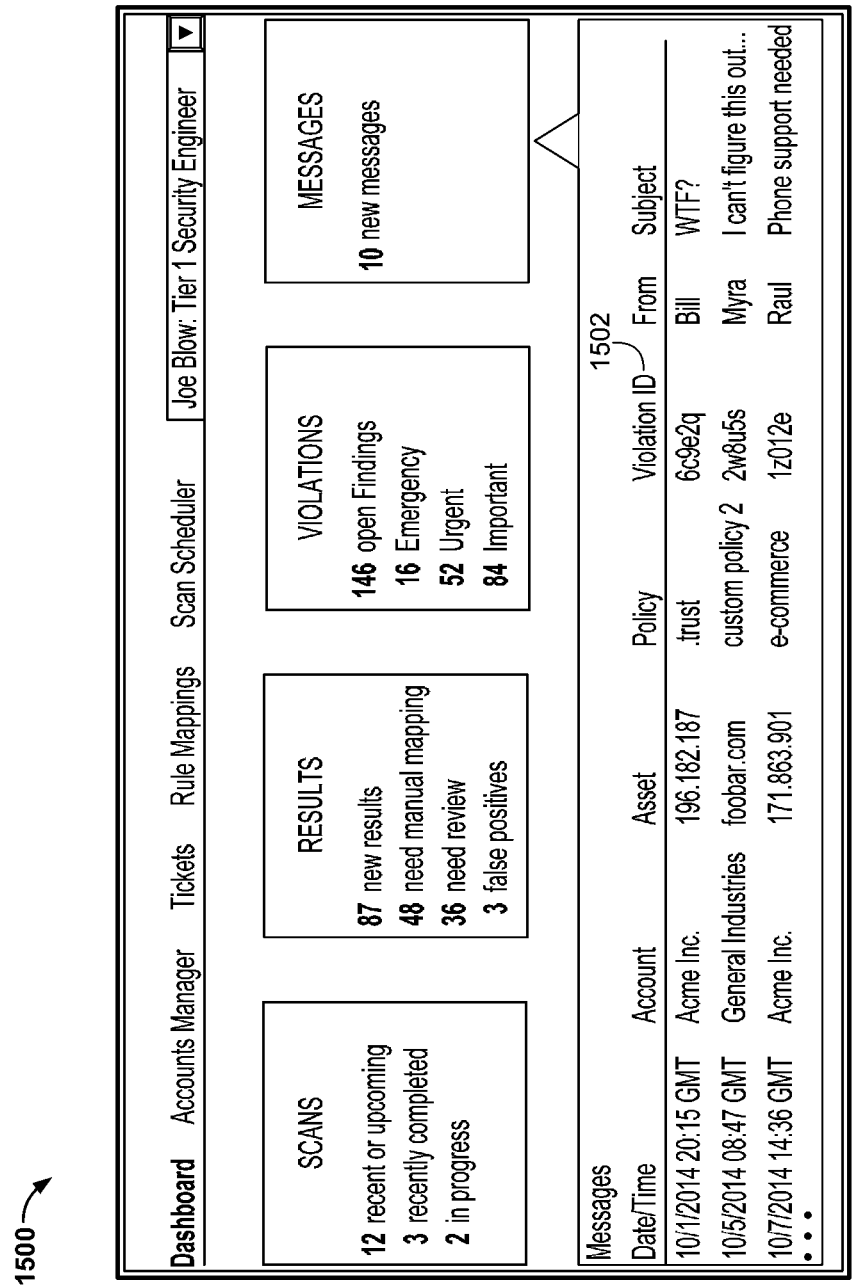
FIG. 15 illustrates an embodiment of an operator interface as rendered in a browser.

In FIG. 15, Joe has clicked on region 1210 of interface 1200 and has been shown interface 1500 as a result. In interface 1500, Joe is shown customer messages and support requests relating to violations that alerter 256 has notified customers of through interface 138 and which violations the operator violation module 236 has permitted Joe to view.

In FIG. 16, Joe has clicked on tab 1212 of interface 1200 and is being shown a list of specific, outstanding issues needing operator attention and which Joe has permission to view. In FIG. 17, Joe has clicked on one of the tickets shown to him in interface 1600 (ticket 1602). Interface 1700 shows the details of a particular ticket, such as ticket 1602. Here, Joe can review the various features of the ticket, such as what type of ticket it is, what type of scan generated the ticket, which scanning company was used to perform the scan, the scanning company's scan identifier, the date and time that the scan was performed, the date and time that the ticket was generated, the priority level for the scan's resulting violation, the date required for customer to remediate the violation and remain in compliance with the associated policy regime, the asset associated with the violation, and the policy regime that was applied to that asset. Additionally, Joe can read from the ticket's description that the test that resulted in the ticket being generated requires an operator to map the result (of an external scan) to a violation of a rule in the .secure policy regime. Joe can perform the mapping by selecting a rule from dropdown 1702.

Finally, in FIG. 18, Joe is reviewing a set of mappings between particular scan results and rules, as generated by and stored within ruleset database 252. Joe arrived at interface 1800 after navigating to rule mappings tab 1214. Using interface 1800, Joe is able to edit the mappings (thereby editing data stored in ruleset database 252) between particular tests and particular rules. He can do this by clicking the appropriate "Edit" link (e.g., link 1802). Additionally, Joe can add a new rule (by clicking "+ add a Policy") that he wishes to test the customer's asset/resource against, add a new scan result (by clicking "+ add a scanner"), or add a new Identifier (by clicking "+ an identifier").

Additional Embodiments of Policy Configuration and Enforcement Interfaces

In the following section, additional embodiments of interfaces usable to interact with platform 102 will be described.

Policy Configuration Interface

Figure 19:
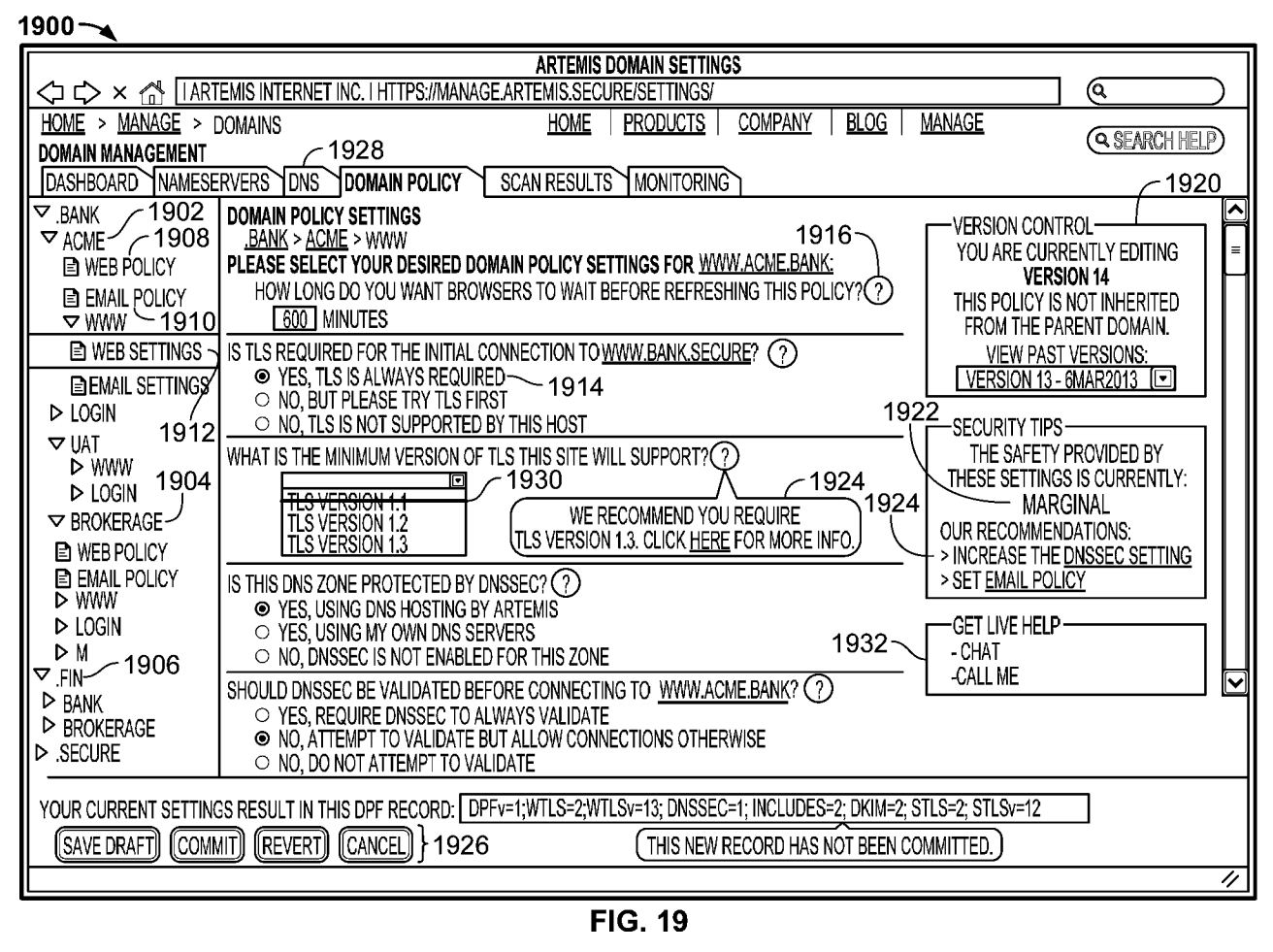

FIG. 19 illustrates an additional embodiment of a regime configuration interface, as rendered in a browser. In the example shown, Alice is configuring a set of policies (via an embodiment of interface 138) that will be enforced against systems reachable via acme.bank, such as mail .acme.bank and www.acme.bank.

As illustrated in interface 1900, ACME Bank has successfully registered domains in several TLDs, including acme.bank (1902), brokerage .bank (1904), and bank .fin (1906). Each of the TLDs (e.g., .secure, .fin) is a higher trust TLD and supports some degree of policy enforcement. In various embodiments, each TLD can make available an interface for configuring policies (e.g., by operating its own embodiment of platform 102). Other entities, such as registrar 108 or registries 130-134, can also contract to provide policy configuration services on behalf of multiple TLD/registries (whether contracting with platform 102 or operating its own embodiment of platform 102), and, as explained above, platform 102 can also provide services directly (e.g., to Alice).

For each of the domains shown in FIG. 19, Alice can specify policies that will be enforced for web connections (e.g., by clicking on link 1908), email connections (e.g., by clicking on link 1910), and any other appropriate types of connections, such as FTP (not shown). Alice is currently configuring the policies that will apply to connections involving www.acme.bank (1912). In this example, a policy is composed from one or more "entries"—each of which defines a rule applicable to the identity of the organization, or connections to resources (such as servers). One example entry is a requirement that TLS be used to secure all communications with www.bank.secure (1914). For each configurable option, help can be accessed by clicking on the accompanying help icon (e.g., 1916). In various embodiments, policy settings that do not meet the minimum standards required by the TLD are crossed out, greyed out, or otherwise not available (e.g., are not shown at all). For example, suppose the TLD .bank has as a minimum requirement that TLS Version 1.2 (or higher) be used. Alice's ability to select TLS Version 1.1 is removed accordingly (1930). If Alice has any questions, she can (e.g., subject to the level of support she has contracted for) obtain real time help configuring her policies from an operator by selecting the appropriate option in region 1932.

Administrative information, such as versioning information, is displayed in region 1920. Feedback as to the security of the current policy settings (1922) and recommendations for improvement are also displayed (1924). Also, in this example, suppose interface 1900 is made available by an embodiment of platform 102 that is operated by or otherwise configured to work in conjunction with DNS/nameserver services provided by registrar 108/registry 130. In this example, Alice can modify DNS and nameserver settings by selecting one of the appropriate tabs (e.g., tab 1928). In some embodiments, the DNS and nameserver tabs will not be functional for Alice's domains and will be absent or greyed out in the interface, for example, where the provider of interface 1900 does not offer such services.

Finally, Alice can commit her policy, revert to a previous version, cancel any changes, or save her changes as a draft by selecting the appropriate button in region 1926. In some embodiments, Alice is also offered a button that will allow her to test ACME's servers for compliance with a new policy, prior to the policy being activated/enforced. Alice can also run on-demand tests, and policies applicable to all domains in the TLD may also require that periodic testing be performed for all domains. In various embodiments, owners of higher trust domains pay for monitoring services, such as by paying registrar 108, registries 130-134, or platform 102, a set amount per test or paying for a year of testing services.

Policy Enforcement Verification Interface

Figure 20:
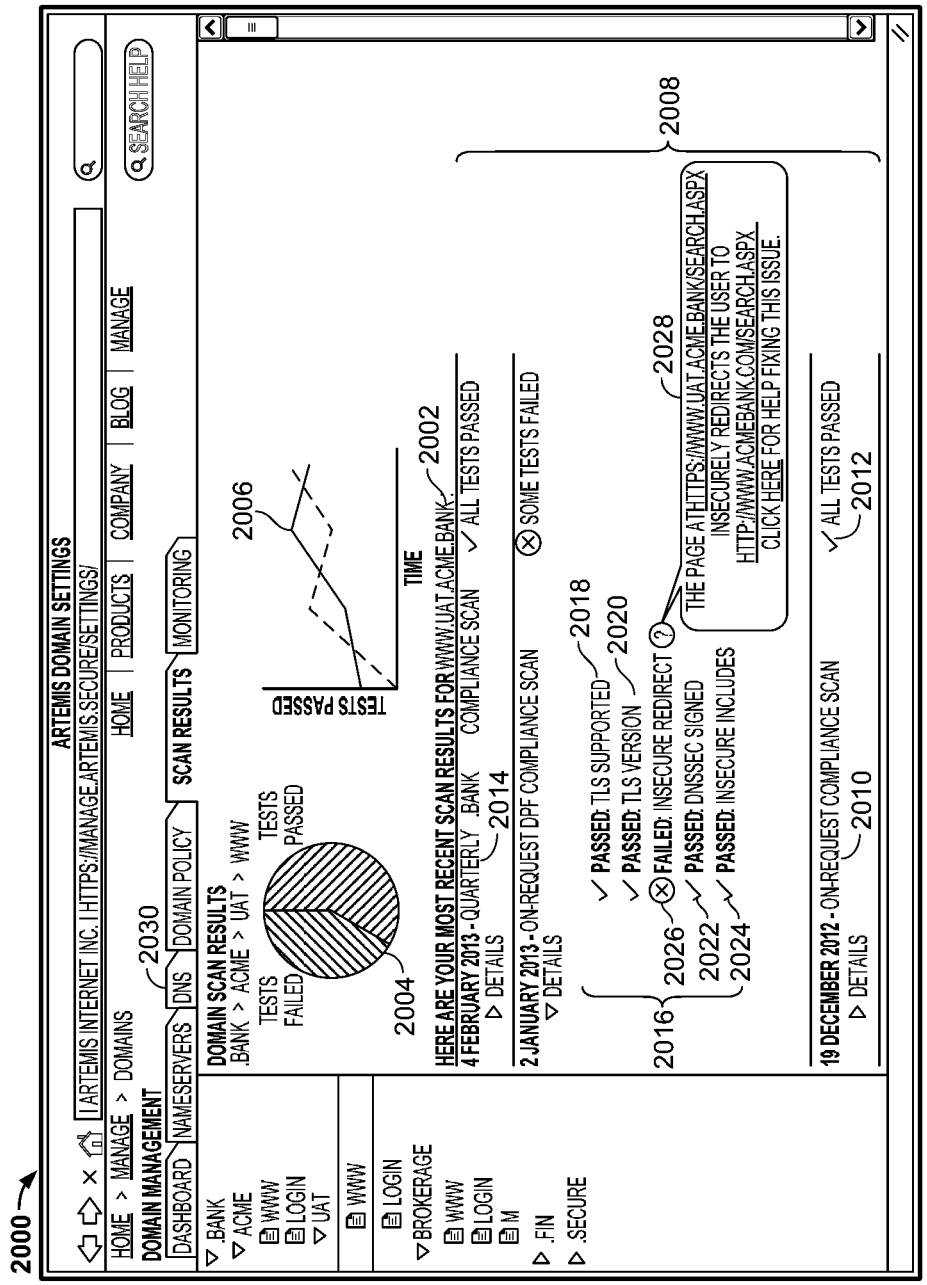
FIG. 20 illustrates an additional embodiment of a violation interface, as rendered in a browser.

FIG. 20 illustrates an additional embodiment of a violation interface, as rendered in a browser. In the example shown in FIG. 20, Alice is viewing (via an embodiment of interface 138) the results of an assessment of the site "www.uat.acme.bank" (2002) performed by platform 102. Various charts are included, showing the percentage of policy passes/fails (2004) and the pass/fail trend over time (2006).

Included in region 2008 are summaries of three assessments that were performed. Specifically, on Dec. 19, 2012, Alice requested an assessment (2010) and the site was in full compliance with the applicable requirements (2012)—i.e., any minimum requirements set by .bank, and any additional requirements specified by Alice (e.g., via interface 1900). On Feb. 4, 2013, an assessment of the site was automatically performed (2014) on behalf of the .bank TLD regarding its minimum requirements. In the example shown in FIG. 20, .bank requires quarterly assessments of all .bank sites. Automatic scans can be performed with other frequencies, and the frequency of assessments can be made dependent on factors such as whether the site is used by a corporate entity (e.g., more frequent assessments) or an individual (e.g., less frequent assessments). Automatic assessments can also be triggered based on events, such as a requirement that a site be assessed any time a policy change is committed. In various embodiments, domains to be assessed are added to job queue 206 and handled by assessment coordinator 208 as resources are available. Assessment results are saved, such as in results database 234, which also includes other information about the domains. In various embodiments, results database (or portions of the data contained therein) is hosted by an entity external to platform 102 (e.g., registrar 108), and/or is spread across multiple databases, as applicable.

On Jan. 2, 2013, Alice requested that an assessment be performed, details of which are presented in region 2016. As indicated in the title, "On-Request DPF Compliance Scan," the assessment being performed pertains to the policy specified by Alice in interface 1900. As shown, at the time the assessment was performed, the site (www.uat.acme.bank) required TLS (2018), used an approved version of TLS (2020), its DNS information was DNSSEC signed (2022), and the content did not include any insecure includes (2024). The site failed one test (2026) because a page protected by HTTPS redirected to a page that used unencrypted HTTP. Detail regarding the failure, as well as instructions for correcting the problem are presented in region 2028.

The assessments summarized in interface 2000 were performed at the direction of job scheduler 204. As illustrated in FIG. 2, platform 102 makes use of a pool of scanners 226-232 in performing assessments. In various embodiments, at least some of the scanners in the pool comprise virtual machines. In various embodiments, the virtual machines are loaded as needed, at geographically diverse locations, and can execute on third party hardware, such as is provided by one or more third party cloud computing vendors. Further, as explained above, platform 102 can cooperate with a plurality of external scanners (e.g., with each external scanner provided by a different third party scanner vendor) to perform assessments.

Discovery Engine

As explained above, customers of platform 102 can manually supply asset information for inclusion in asset database 202 (e.g., by uploading a spreadsheet that contains the asset data, or by interacting with an interface (such as region 312 of interface 300). Using techniques described herein, assets can also be included in asset database 202 by discovery engine 248, configured to facilitate the discovery of assets and to include those assets in asset database 202. Discovery engine 248 can use a variety of approaches to discover assets. As a first approach, discovery engine 248 can be configured to receive information from one or more DNS servers that has been instrumented to provide information to platform 102 (or has information otherwise collected from it and transmitted to platform 102, e.g. by a third party).

In some cases, authorization may not be available (e.g., for a third party such as an operator of platform 102) to instrument DNS servers and/or sniff or otherwise analyze traffic associated with DNS servers for information on behalf of discovery engine 248. In such scenarios, discovery engine 248 can be configured to receive and process information supplied to it (e.g., by an administrator of a DNS server) in a pre-packaged log format. In various embodiments, the pre-packaged log has been sanitized (e.g., by the sender of the log, to remove information such as requestor IP addresses, for privacy reasons). Other sources of DNS log data (e.g., obtained from public sources of DNS logs, or transmitted to platform 102 by private entities, such as customers) can also be provided to discovery engine 248 for processing and ingestion of any discovered computing resources. As a second approach, customers of platform 102 can authorize platform 102 to perform zone transfers. In that scenario, discovery engine 248 (e.g., via one or more DNS clients that automatically pull information from the customers' DNS servers) can examine the customer's zone file and determine whether any computing resources are present in the zone file and not present in asset database 202.

Detecting New Computing Resources

In some embodiments, some customers (e.g., enterprise domain owners) choose to subscribe to an asset discovery and auto-enrollment service provided by platform 102. In various embodiments, the service: (i) alerts the customers when assets within their organization are brought online, or exposed through a domain that is related to one monitored for policy compliance using platform 102; and (ii) permits an operator of platform 102 to automatically enroll such discovered assets in platform 102 services, and take actions such as automatically assesses the newly discovered assets against an appropriate policy compliance regime. Such a service can enhance the domain owner's visibility of its enterprise network and ability to ensure policy compliance throughout.

Suppose, when Alice was initially configuring platform 102's services for use with ACME infrastructure, she subscribed to platform 102's asset discovery and auto-enrollment services and uploaded a spreadsheet of ACME assets (e.g., for ingestion into asset database 202). Further suppose, as described above (e.g., in conjunction with FIG. 20), Alice has successfully been able, via interface 2000, to confirm that all of ACME's computing resources available via a .bank address are in compliance with both the requirements of the .bank TLD and any additional requirements imposed by Alice. Now suppose that, without Alice's knowledge or permission, another ACME Bank administrator, Dan, brings a new server online. In particular, the marketing department at ACME Bank cajoled Dan into setting up a mobile-oriented website at http://m.acme.bank (158 of FIG. 1) for use in a promotion. The site is linked to/from ACME Bank's main website at http://www.acme.bank (106). The mobile site is not compliant with either ACME Bank's custom policy regime, or the minimum standards required by the .bank TLD. For example, site 158 does not support TLS at all. As another example, the mobile site is hosting copies of an executable file that users are encouraged to download and install on their phones, in contradiction to a rule included in ACME's custom policy regime that forbids the presence of executables on its websites.

As mentioned above, in various embodiments, registrar 108 provides DNS hosting services to its customers. For example, if applicable, Alice can configure such services by selecting tab 2030. In such a scenario, discovery engine 248 can be made aware of a new site, such as site 158 immediately, and can immediately enforce its adherence to .bank and ACME-specific requirements (i.e., by including information pertaining to site 158 in asset database 202 and automatically attaching an applicable policy regime to the site). It could also be the case, however, that ACME Bank makes use of third party DNS hosting services. If so, platform 102 might be unaware that the mobile site 158 exists, and thus does not know that initial and periodic scanning of the site should be performed. Using techniques described herein, platform 102 can nonetheless be automatically notified of the existence of site 158, still allowing platform 102 to add the site to asset database 202 and automatically assess the asset for compliance with an applicable policy regime.

FIG. 21A illustrates an embodiment of an environment that includes a nameserver. In the example shown in FIG. 21, nameserver 136 and nameserver 2102 are both members of the cluster of servers 148 responsible for responding to DNS requests for .bank. They are in communication with Anycast router 2110. As will be described in more detail below, nameserver 136 is instrumented to perform statistical sampling on the DNS requests it receives and provide information to discovery engine 248.

FIG. 21B illustrates an embodiment of an environment that includes a nameserver. In the example shown in FIG. 21B, nameservers 2104 and 2106 are typical nameservers and are not instrumented to perform statistical sampling. Instead, such sampling is performed by a listener 2108, which runs packet analysis software such as SNORT and is configured to sniff UDP 53 traffic. Listener 2108 provides information to discovery engine 248 and includes components such as components 2114-2120 (as discussed further below in FIG. 216). In various embodiments, multiple listeners are used, such as for load balancing reasons.

FIG. 21C illustrates an embodiment of a nameserver. Specifically, FIG. 21C depicts an embodiment (2136) of nameserver 136. Nameserver 2136 is configured to run typical DNS software such as BIND (2112). Nameserver 2136 is further configured to log the DNS requests it receives to a map file 2114. A log processor 2116 uses a hash table of known domains 2118 (e.g., including "acme.bank") to evaluate the log. When nameserver 2136 receives a DNS request for a domain that is not represented in hash table 2118, it generates an alert and sends it to discovery engine 248. Further, if the request is for an NXDOMAIN, log processor 2116 adds the domain to list 2120. If the domain is already present in list 2120, a count for the domain is increased. Once the count for a given domain in the NXDOMAIN list exceeds a threshold (e.g., as determined by log processor 2116), nameserver 2136 also sends a report (e.g., to discovery engine 248). The reports sent by nameserver 2136 inform discovery engine 248 that the domain exists, or is likely to exist, or is believed by end users to exist, based on a sufficient number of NXDOMAIN requests and that it should be added to asset database 202.

Hash table 2118 and NXDOMAIN list 2120 can be maintained in a variety of formats. Further, a variety of techniques can be used to keep the information in hash table 2118 current. For example, registrar 108 (or registry 130, or another system) can send a current list of known domains to nameserver 136 once a day.

In various embodiments, nameserver 2136 is configured to detect new IP addresses of new assets by requesting route tables, sending router requests over SMTP or by using a shell interface. When nameserver 2136 receives a response for an IPv6 address that is not represented in hash table 2118, it generates an alert and sends it to discovery engine 248.

Figure 22:
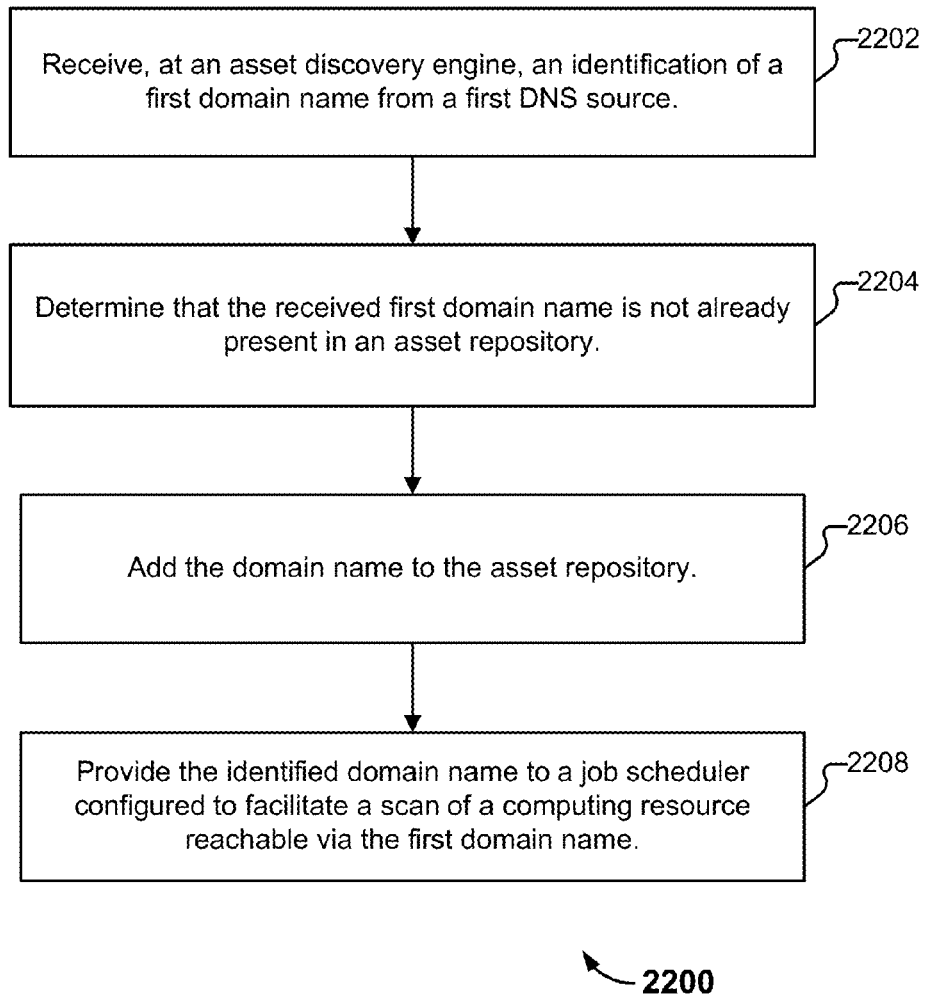
FIG. 22 illustrates an embodiment of a process for scheduling a newly identified computing resource for assessment for compliance with a computing resource policy regime.

FIG. 22 illustrates an embodiment of a process for scheduling a newly identified computing resource for assessment for compliance with a computing resource policy regime. In various embodiments, process 2200 is performed by discovery engine 248, and is performed at the request of the customer whose asset is discovered (e.g., as an ongoing service). The process begins at 2202 when an identification of a domain name is received. As one example, a domain name identification is received at 2202 as a result of process 2300 (described in more detail below). At 2204, a determination is made that the received domain name is not already present in an asset repository. In some embodiments, the determination is made by the owner of the domain name at 2202 (and that determination is provided to discovery engine 248 whether explicitly or implicitly). In other embodiments, the determination is made by discovery engine 248. As one example, discovery engine 248 can compare the received domain name to assets included in asset database 202 to make the determination. At 2206, the domain name is added to the asset repository (e.g., asset database 202). A variety of processing can be performed in conjunction with adding the domain name to the asset repository. As one example, an administrator associated with the received domain can be alerted to the receipt by discovery engine 248 of the domain and asked to confirm or deny the addition of domain to asset database and, in the event the administrator denies the addition, asked to provide an explanation (which can in turn be placed in operator queue 254 for review). As another example, information such as the existence of MX and A records associated with the domain (and any IP addresses) can be checked for (e.g., by discovery engine 248) and included in asset database 202. As yet another example, any policy regimes applicable to the domain can be automatically attached to the domain in conjunction with its addition to asset database 202. Finally, at 2208 the identified domain is provided to a job scheduler (such as job scheduler 204) for assessment.

Figure 23:
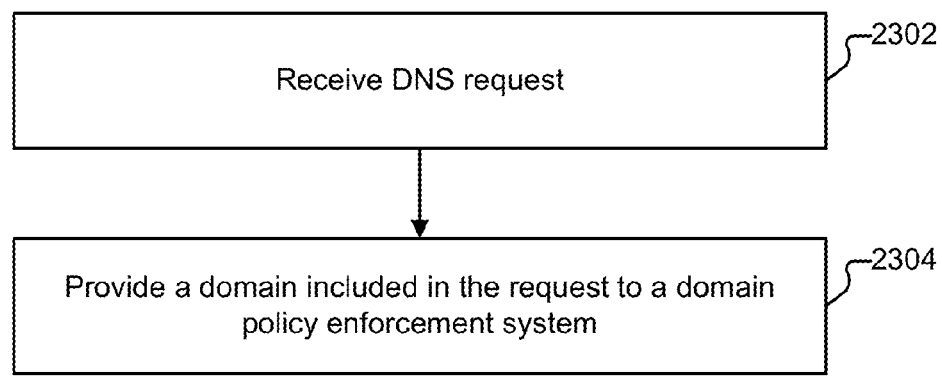
FIG. 23 illustrates an embodiment of a process for determining that a domain should be processed by a policy regime enforcement platform.

FIG. 23 illustrates an embodiment of a process for determining that a domain should be processed by a policy regime enforcement platform. An example of such a platform is platform 102. In some embodiments, process 2300 is performed by nameserver 136. In other embodiments, process 2300 is performed by listener 2108, or by a combination of multiple devices working in combination.

The process begins at 2302 when a DNS request is received. As one example, suppose "Ed," an owner of cellphone 156, has come across the promotion concocted by the ACME Bank marketing department. He uses his phone to access site 110 and clicks on a link directing him to site 158. When he does so, phone 156 makes a DNS request for m.acme.bank which is ultimately passed on to nameserver 136. The request is added to map file 2114 and received by log processor 2116 at 2202.

Log processor 2116 compares the received domain to its hash table 2118 and determines that the domain is new. Accordingly, at 2304 log processor 2116 sends an alert to discovery engine 158, which adds the domain to asset database 202 (e.g., after additional processing is performed). For example, the addition of the domain to asset database 202 can trigger a requirement that the domain be immediately assessed by platform 102. As another example, an alert can be sent (e.g., by alerter 256) to Alice informing her of the detection of computing resources accessible via the acme.bank domain. In some embodiments, the newly detected domain is automatically added to Alice's asset listing and the appropriate policy regime (including any applicable timeframes for performing assessments) attached to the newly detected domain. Recall that Alice has subscribed to platform 102's asset discovery and auto-enrollment services. One reason a customer of platform 102 might be unsure of whether they should subscribe to such services is a concern about automatic charges levied against discovered assets. In various embodiments, platform 102 provides an appropriate notice and grace period prior to assessing charges related to its asset discovery and auto-enrollment services. In other embodiments, Alice (or another ACME administrator) must review and approve the inclusion of the domain in asset database 202. Rules such as a minimum number of times a new domain must be seen at an instrumented nameserver, or whether multiple instrumented nameservers must have seen a given domain prior to it being added to asset database 202 can be specified (whether by an operator, by Alice, or by another appropriate individual, as applicable).

In some embodiments, log processor 2116 is configured to capture full logs and aggregate them along with the logs of other nameservers (e.g., using Apache Hadoop). In such a scenario, rather than log processor 2116 generating alerts and sending them to platform 102, a separate log processor (not collocated on nameserver 136) performs those tasks.

Figure 24:
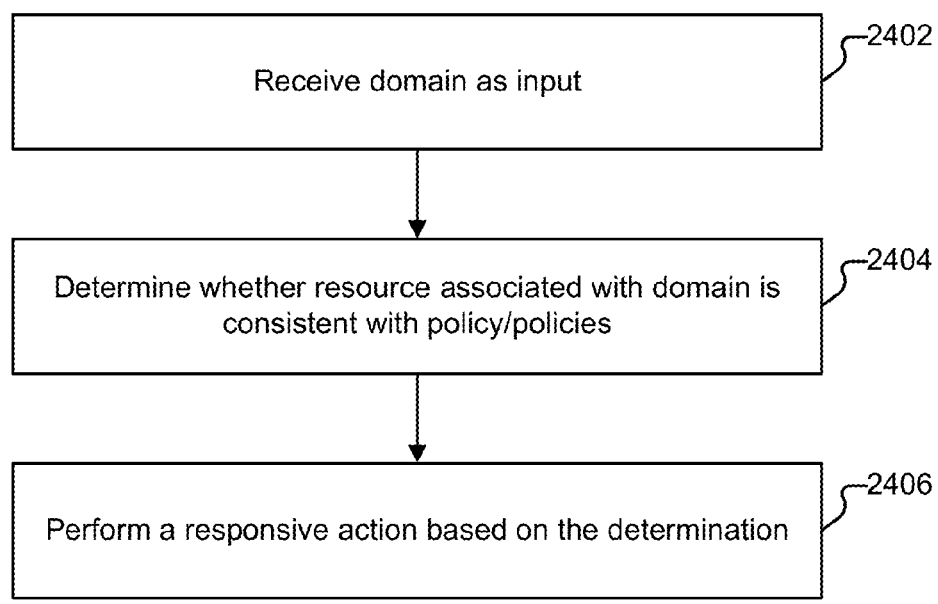
FIG. 24 illustrates an embodiment of a process for performing policy enforcement.

FIG. 24 illustrates an embodiment of a process for performing policy enforcement. In some embodiments process 2400 is performed by registrar 108 (or various components thereof, working in cooperation). In other embodiments, process 2400 is performed by platform 102 and/or by platform 102 working in cooperation with other entities.

The process begins at 2402 when a domain is received as input. As one example, a domain is received as input in response to Alice selecting a "Scan my site now" button provided by interface 138. As another example, a domain is received as input as part of a recurring job, such as a weekly job that scans all .bank sites. As yet another example, a domain is received as input when log discovery engine 248 identifies a new domain (and, as applicable, the owner of the domain has consented to its handling by platform 102).

At 2404, a determination is made as to whether a resource associated with the domain is consistent with a policy regime. As one example, suppose a minimum requirement for a .bank domain is that all webservers support TLS version 1.3, whenever encryption is used. In this scenario, an example of a resource associated with the domain is the serving of web pages by the webserver. If the pages are served by a server that supports TLS version 1.3, then the resource is consistent with the TLD's policy. As another example, a determination can be made as to whether the zone is DNSSEC signed. In some embodiments, base checks are performed prior to, or at the outset of the processing performed at 2404. For example, whether the domain resolves and whether or not it responds to pings are determined.

Suppose ACME Bank has a more stringent requirement than the .bank requirement. Specifically, suppose ACME Bank requires that all web traffic be encrypted. Again, at 2404, a determination is made as to whether pages served by ACME Bank via its webserver are encrypted. In various embodiments, compliance with multiple regimes (e.g., the TLD policy and the customer's own regime) is tested for at 2404.

At 2406, a responsive action is performed based on the determination made at 2404. As one example, suppose the resource (e.g., the web server) is found to be compliant with all policies at 2404. In such a scenario, a report of success is sent to an administrator at 2406. Other actions can also be taken, such as updating database 260 or displaying a result in interface 138. If the resource is not compliant, a variety of actions can also be taken. For example, an error report can be sent to an administrator of the site. As another example, the administrator can be asked to load an interface such as interface 900 or interface 2000 from which the administrator can receive help in correcting the problem and performing re-tests to confirm the problem is resolved. The administrator can be given a finite amount of time to remedy the problem (e.g., one hour or twelve hours) after which time DNS query services could be suspended until the problem is resolved. As another example, for entities such as banks, a series of escalations can take place (e.g., sending an email, then calling phone numbers in a particular order) until acknowledgement is received from the domain holder that the problem is being investigated.

As yet another example, suppose the entity that registered the domain has a malicious intent. In such a scenario, the non-compliance of the domain with a policy (e.g., hosting malicious executables) would be detected at 2404. Unlike the bank employee, the malicious individual would not be motivated to make the site secure, and could have DNS services automatically shut off at 2406 after a period of time elapsed with the problem not being corrected. Or, depending on the severity of the non-compliance, DNS services could be shut off immediately. Other factors, such as the length of time the domain has been registered, the organizational size of the domain owner, and the level of verification performed on the organization, can be taken into account when determining the responsive actions taken at 2406. For example, an individual who recently registered a domain that is found to be non-compliant at 2404 can be given significantly less time to correct the problems prior to having DNS services shut off than a verified Fortune 500 company who registered the domain more than a year ago.

Outsourced Model

Suppose .mail registry 134 has contracted with registrar 108 (or another appropriate entity) to provide policy regime enforcement services on behalf of the .mail TLD. Further suppose nameserver 174 is authoritative for the ".mail" TLD. In various embodiments, registrar 108 collects logs from nameserver 174 (or, a component of platform 102 collects the logs) and one or more log processors examine those logs for new domains. As with log processor 2116, newly discovered domains can be added to asset database 202, and queued for assessment by job scheduler 204 (or by an alternate scanning engine operated by another entity, as applicable). As with portion 2406 of process 2400, one or more responsive actions can be taken in response to the scanning results, such as by sending an email to the owner of the secondary domain under .mail, asking the owner of the site to log into an interface provided by registry 134 (e.g., a portal interface reachable from an interface to registry 134), etc.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
an interface configured to:
receive a computing resource policy regime specification from a first user, wherein the computing resource policy regime specification is applicable to a set of one or more computing resources sharing at least a portion of a first domain name, wherein the first domain name comprises a domain designated as a higher trust domain, wherein the computing resource policy regime specification comprises a plurality of rules describing a set of requirements with which a given computing resource belonging to the set must comply, and wherein receiving the computing resource policy regime specification includes receiving a command to duplicate an existing policy specification and creating the policy regime specification as a copy of the existing policy specification;

a set of one or more processors configured to:
associate the received computing resource policy regime specification with a first computing resource, wherein the association is performed based at least in part on the first computing resource being accessible via a resource domain name that includes at least the portion of the first domain name; and
dispatch an assessment of compliance by the first computing resource with the associated received computing resource policy regime specification, wherein the assessment includes performing a set of one or more scans of the first computing resource for compliance with at least some of the requirements included in the set of requirements, and wherein at least one of the requirements included in the set of requirements pertains to a protocol used by the first computing resource; and
a memory coupled to the set of one or more processors and configured to provide the set of one or more processors with instructions.

2. The system of claim 1 wherein the existing policy specification includes a set of minimum security requirements and wherein any changes made by the first user to the copy of the existing policy specification are prevented from relaxing the set of minimum security requirements.

3. The system of claim 1 wherein receiving the computing resource policy regime specification includes receiving an indication of a frequency with which at least a portion of the assessment should be performed.

4. The system of claim 1 wherein the set of one or more processors is further configured to provide an estimated cost associated with performing at least a portion of the assessment.

5. The system of claim 4 wherein the set of one or more processors is further configured to, in response to receiving a proposed modification to at least one of: (1) the computing resource policy regime specification, and (2) a frequency with which at least one portion of the assessment is to be performed: provide an updated estimated cost associated with performing the at least a portion of the assessment.

6. The system of claim 4 wherein the estimated cost is dynamically adjusted based at least in part on a surge pricing determination.

7. The system of claim 1 wherein the set of one or more processors is further configured to indicate to the first user which portions of the assessment can optionally involve a human operator.

8. The system of claim 1 wherein the set of one or more processors is configured to receive the computing resource policy regime specification at least in part by receiving information from the first user via the interface.

9. The system of claim 8 wherein at least some of the information received from the first user comprises a selection, from a set of preexisting rules, of which rules should be enabled.

10. The system of claim 8 wherein at least some of the information received from the first user comprises an indication, for at last one rule included in the computing resource policy regime specification, that a human operator should be involved in the assessment.

11. The system of claim 1 wherein the set of one or more processors is further configured to deliver results.

12. The system of claim 11 wherein the set of one or more processors is further configured to receive, from the first user, an indication of whether a result associated with the assessment should be verified.

13. The system of claim 1 wherein the assessment is dispatched in accordance with a schedule specified by an administrator associated with the computing resource.

14. A method, comprising:
receiving a computing resource policy regime specification from a first user, wherein the computing resource policy regime specification is applicable to a set of one or more computing resources sharing at least a portion of a first domain name, wherein the first domain name comprises a domain designated as a higher trust domain, wherein the computing resource policy regime specification comprises a plurality of rules describing a set of requirements with which a given computing resource belonging to the set must comply, and wherein receiving the computing resource policy regime specification includes receiving a command to duplicate an existing policy specification and creating the policy regime specification as a copy of the existing policy specification;
associating the received computing resource policy regime specification with a first computing resource, wherein the association is performed based at least in part on the first computing resource being accessible via a resource domain name that includes at least the portion of the first domain name; and
dispatching an assessment of compliance by the first computing resource with the associated received computing resource policy regime specification, wherein the assessment includes performing a set of one or more scans of the first computing resource for compliance with at least some of the requirements included in the set of requirements, and wherein at least one of the requirements included in the set of requirements pertains to a protocol used by the first computing resource.

15. The method of claim 14 wherein the existing policy specification includes a set of minimum security requirements and wherein any changes made by the first user to the copy of the existing policy specification are prevented from relaxing the set of minimum security requirements.

16. The method of claim 14 wherein receiving the computing resource policy regime specification includes receiving an indication of a frequency with which at least a portion of the assessment should be performed.

17. The method of claim 14 further comprising providing an estimated cost associated with performing at least a portion of the assessment.

18. The method of claim 17 further comprising, in response to receiving a proposed modification to at least one of: (1) the computing resource policy regime specification, and (2) a frequency with which at least one portion of the assessment is to be performed: providing an updated estimated cost associated with performing the at least a portion of the assessment.

19. The system of claim 17 wherein the estimated cost is dynamically adjusted based at least in part on a surge pricing determination.

20. A computer program product embodied in a non-transitory computer readable storage medium and comprising computer instructions for:
- receiving a computing resource policy regime specification from a first user, wherein the computing resource policy regime specification is applicable to a set of one or more computing resources sharing at least a portion of a first domain name, wherein the first domain name comprises a domain designated as a higher trust domain, wherein the computing resource policy regime specification comprises a plurality of rules describing a set of requirements with which a given computing resource belonging to the set must comply, and wherein receiving the computing resource policy regime specification includes receiving a command to duplicate an existing policy specification and creating the policy regime specification as a copy of the existing policy specification;
- associating the received computing resource policy regime specification with a first computing resource, wherein the association is performed based at least in part on the first computing resource being accessible via a resource domain name that includes at least the portion of the first domain name; and
- dispatching an assessment of compliance by the first computing resource with the associated received computing resource policy regime specification, wherein the assessment includes performing a set of one or more scans of the first computing resource for compliance with at least some of the requirements included in the set of requirements, and wherein at least one of the requirements included in the set of requirements pertains to a protocol used by the first computing resource.

* * * * *

UNITED STATES PATENT AND TRADEMARK OFFICE
CERTIFICATE OF CORRECTION

PATENT NO. : 9,106,661 B1
APPLICATION NO. : 14/274668
DATED : August 11, 2015
INVENTOR(S) : Alexander Charles Stamos Page 1 of 1

It is certified that error appears in the above-identified patent and that said Letters Patent is hereby corrected as shown below:

In Title Page 2, Item 56, Right side column, References cited, Citation no. 16, delete "2013/0276053 A1 1/2013 Thornewell et al." and insert --2013/0276053 A1 10/2013 Hugard et al.--, therefor.

Signed and Sealed this
Sixteenth Day of August, 2016

Michelle K. Lee
*Director of the United States Patent and Trademark Office*